US012719720B2

(12) United States Patent
Chaki et al.

(10) Patent No.: US 12,719,720 B2
(45) Date of Patent: Aug. 25, 2026

(54) METHOD AND DEVICE FOR CHANNEL PREDICTION IN WIRELESS COMMUNICATION SYSTEMS

(71) Applicant: NEC Corporation, Tokyo (JP)

(72) Inventors: Prakash Chaki, Tokyo (JP); Jun Shikida, Tokyo (JP); Kazushi Muraoka, Tokyo (JP); Takanobu Doi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 661 days.

(21) Appl. No.: 17/977,605

(22) Filed: Oct. 31, 2022

(65) Prior Publication Data

US 2024/0146581 A1 May 2, 2024

(51) Int. Cl.
*H04L 25/02* (2006.01)

(52) U.S. Cl.
CPC ........ *H04L 25/0212* (2013.01); *H04L 25/022* (2013.01); *H04L 25/0224* (2013.01)

(58) Field of Classification Search
None
See application file for complete search history.

(56) References Cited

U.S. PATENT DOCUMENTS 5,867,485 A * 2/1999 Chambers .............. H04H 40/27 370/281
7,230,909 B1 * 6/2007 Raissinia .............. H04L 5/0007 370/335
8,036,669 B2 * 10/2011 Dong .................. H04B 7/0408 370/335
8,320,339 B2 * 11/2012 Dong .................. H04B 7/0408 370/335
8,971,431 B1 * 3/2015 Niu ...................... H04L 25/024 375/260
2007/0249402 A1 * 10/2007 Dong .................. H04W 16/28 455/562.1
2008/0151745 A1 * 6/2008 Rahm .................. H04B 7/0408 370/310
2013/0237271 A1 * 9/2013 Rahm .................. H04W 16/28 342/372
2014/0010274 A1 * 1/2014 Medbo ................ H04B 17/373 375/224
2014/0211889 A1 * 7/2014 Arambepola ......... H04L 27/265 375/350

(Continued)

OTHER PUBLICATIONS

Andrea Goldsmith, "Wireless Communications", Cambridge Univ. Press, 2005, 606 pages.

(Continued)

*Primary Examiner* — Christopher T Wyllie
(74) *Attorney, Agent, or Firm* — Sughrue Mion, PLLC

(57) ABSTRACT

A communication device includes: a wireless transceiver configured to communicate with another communication device through a wireless channel; and at least one processor configured to execute instructions to: a) estimate at least one first channel response of the wireless channel based on a predetermined signal received from the another communication device; and b) predict a second channel response based on the at least one first channel response by an extrapolation method for signal transmission to the another communication device at a time instant where no channel estimation is performed.

18 Claims, 32 Drawing Sheets

(56) References Cited

U.S. PATENT DOCUMENTS

| | | | | |
|---|---|---|---|---|
| 2015/0172088 | A1* | 6/2015 | Arambepola | H04L 25/0232<br>375/296 |
| 2016/0285664 | A1* | 9/2016 | Arambepola | H04L 27/2665 |
| 2020/0099434 | A1* | 3/2020 | Wang | H04B 7/0452 |
| 2023/0076897 | A1* | 3/2023 | Svedman | H04L 5/0053 |
| 2023/0098013 | A1* | 3/2023 | Ma | H04W 24/08<br>370/329 |

OTHER PUBLICATIONS

Alexandra Duel-Hallen et al., “Long-range prediction of fading signals,” IEEE Signal Processing Magazine, May 2000, pp. 62-75, vol. 17, No. 3.

* cited by examiner

DOWNLINK TRANSMISSION WITH BEAMFORMING

Avg. User Throughput (bps/Hz)
Ave. User Throughput (bps/Hz)
Uplink SRS transmission interval (ms)
Perfect channel tracking
Channel aging (UE velocity = 3 km/hr)
301
302
1.1
1
0.9
0.8
0.7
0.6
0.5
0.4
0.3
0
5
10
15
20
25
30
35

FIG. 5

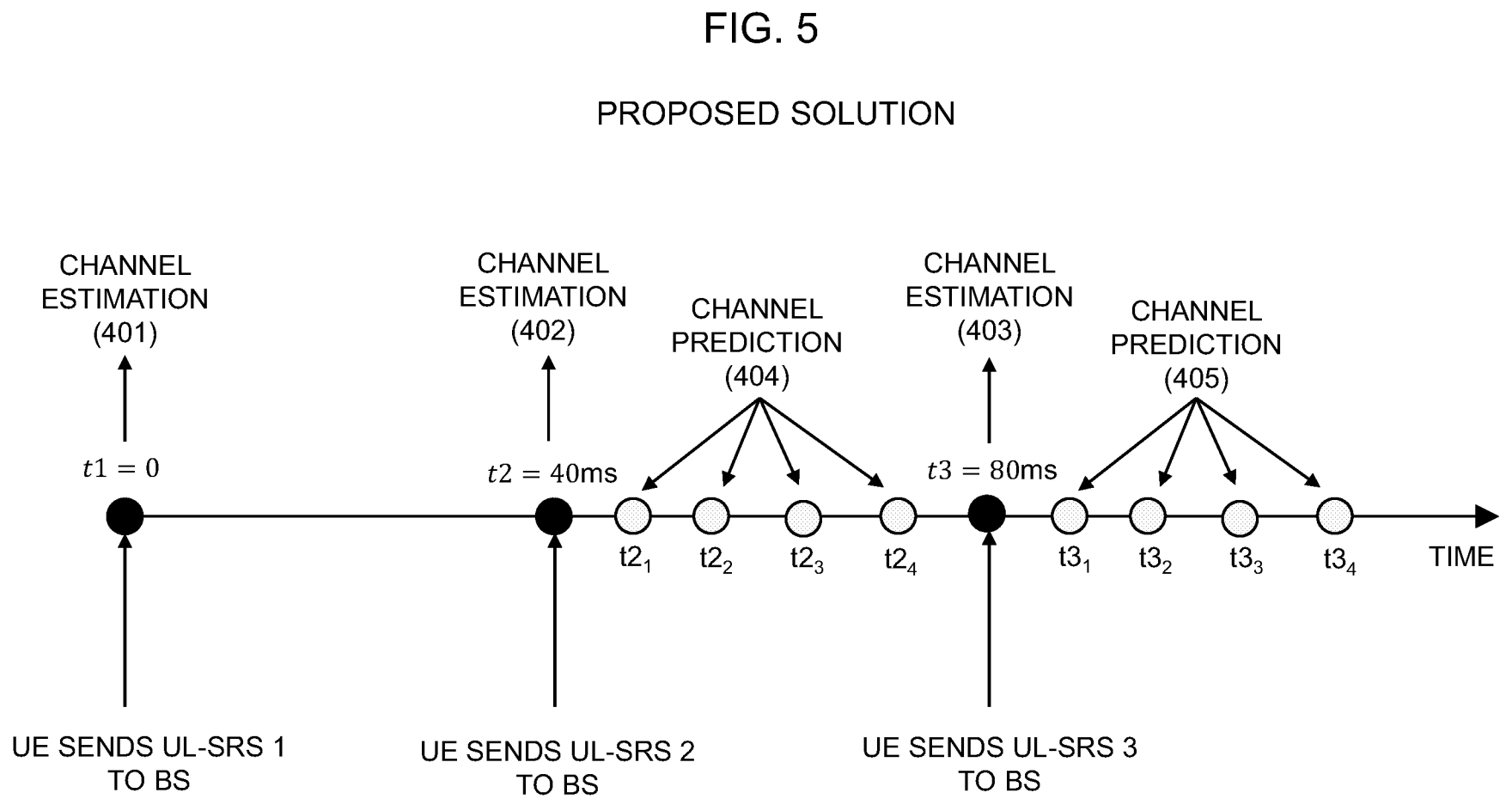

PROPOSED SOLUTION

CHANNEL ESTIMATION (401)

$t1 = 0$

UE SENDS UL-SRS 1 TO BS

CHANNEL ESTIMATION (402)

$t2 = 40\text{ms}$

UE SENDS UL-SRS 2 TO BS

CHANNEL PREDICTION (404)

$t2_1$ $t2_2$ $t2_3$ $t2_4$

CHANNEL ESTIMATION (403)

$t3 = 80\text{ms}$

UE SENDS UL-SRS 3 TO BS

CHANNEL PREDICTION (405)

$t3_1$ $t3_2$ $t3_3$ $t3_4$

TIME

FIG. 7

CHANNEL GAIN

ANGLE

Figure 10:
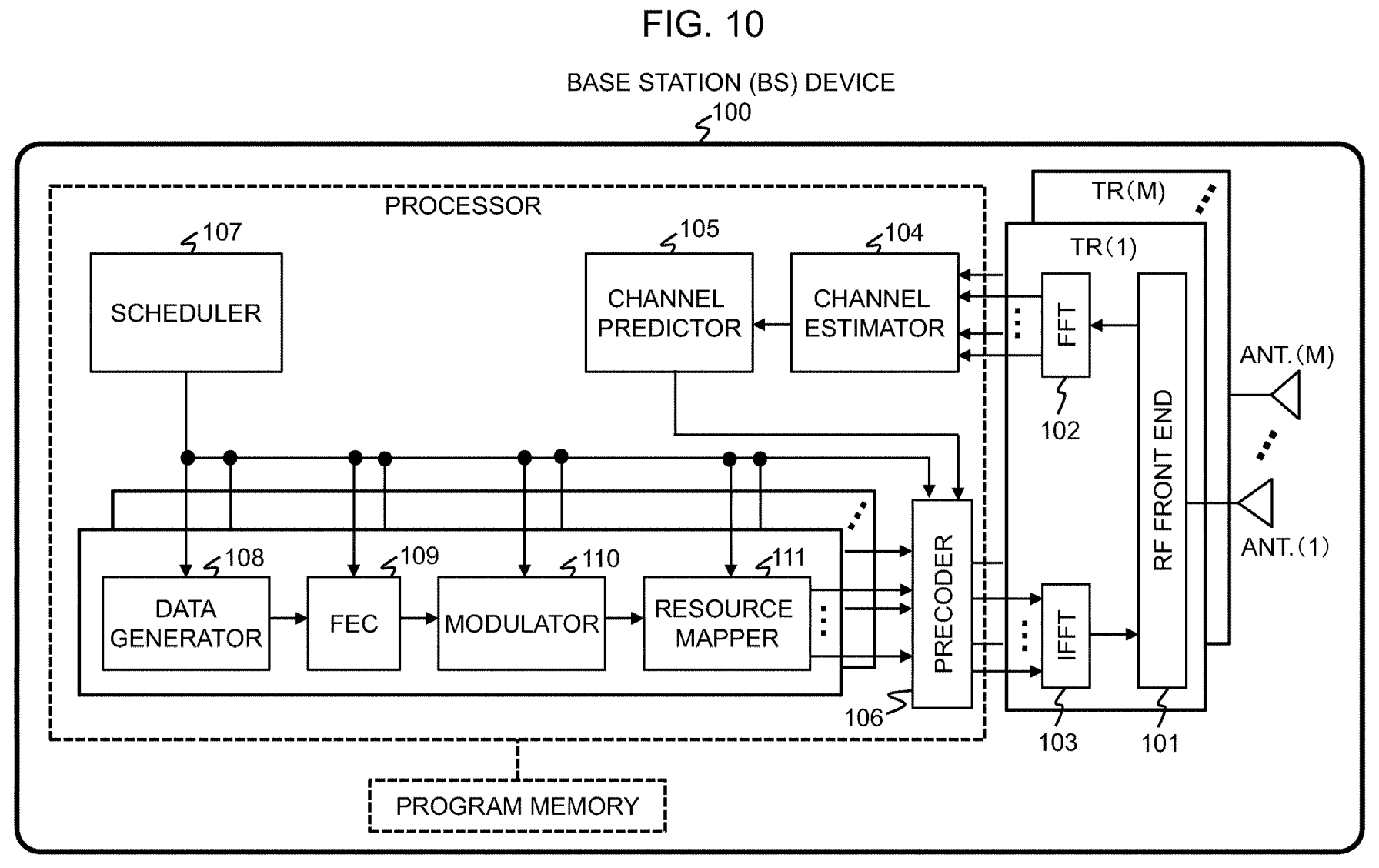

BASE STATION (BS) DEVICE
100

ANT.(M)
ANT.(1)
TR(M)
TR(1)
RF FRONT END
101
FFT
102
IFFT
103
PROCESSOR
CHANNEL ESTIMATOR
104
CHANNEL PREDICTOR
105
PRECODER
106
SCHEDULER
107
DATA GENERATOR
108
FEC
109
MODULATOR
110
RESOURCE MAPPER
111
PROGRAM MEMORY

USER EQUIPMENT (UE) TERMINAL
200
204
INPUT/OUTPUT DEVICE
201
PROCESSOR
202
PROGRAM MEMORY
203
COMM. INTERFACE

NETWORK DEVICE (e.g., BASE STATION)
100
UE TERMINAL
200
RRC SIGNALING (701)
UL-SRS TRANSMISSION (702)
ON DETECTION OF UL-SRS, OBTAIN CHANNEL RESPONSE BASED ON THE UL-SRS
703
PREDICT CHANNEL RESPONSE AT A TIME $T_d$ USING EXTRAPOLATION
704
COMPUTE DOWNLINK BEAMFORMING WEIGHT BASED ON PREDICTED CHANNEL RESPONSE FOR DOWNLINK TRANSMISSION AT TIME $T_d$
705
DL TRANSMISSION (706)

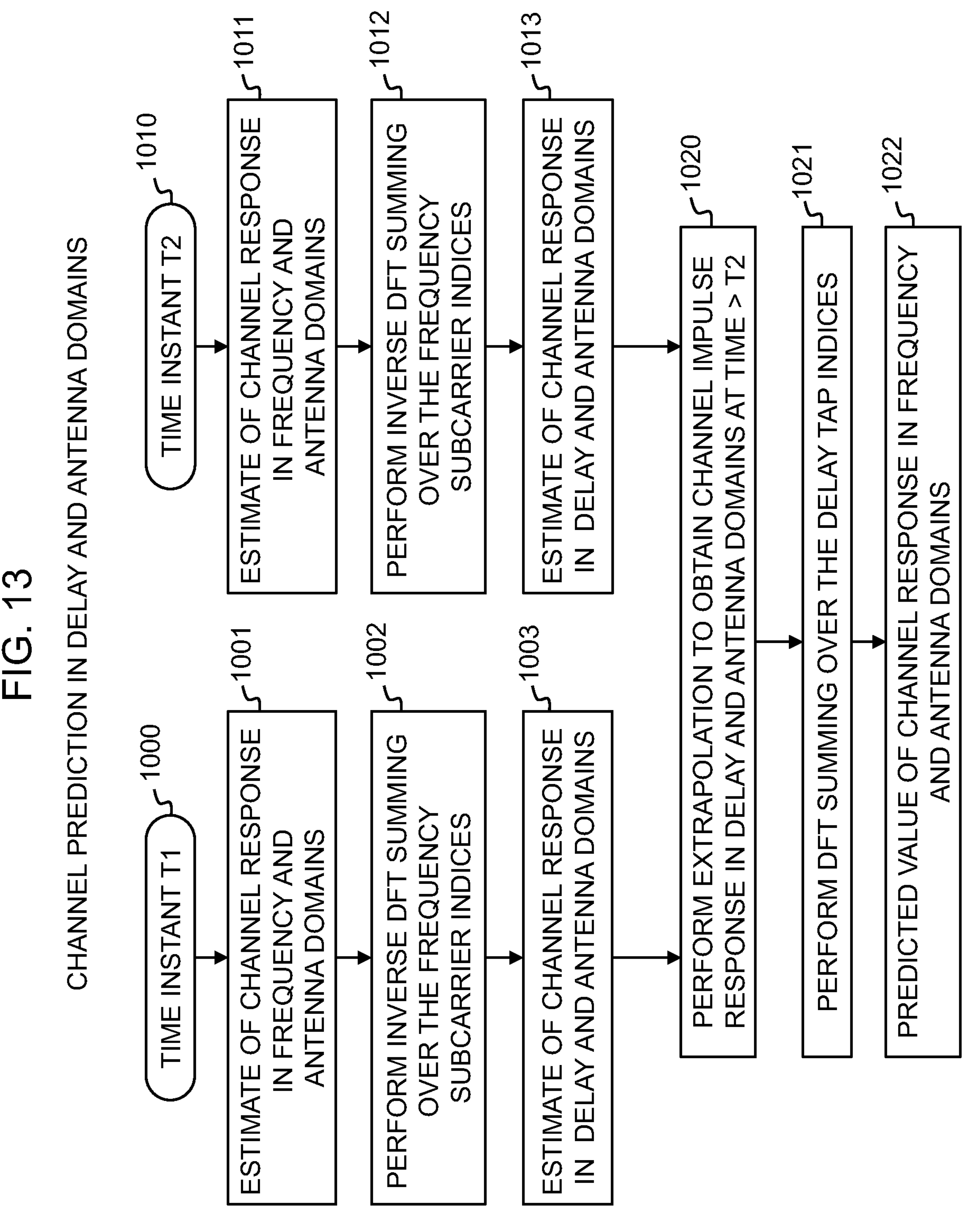
FIG. 13
CHANNEL PREDICTION IN DELAY AND ANTENNA DOMAINS
TIME INSTANT T1
1000
ESTIMATE OF CHANNEL RESPONSE IN FREQUENCY AND ANTENNA DOMAINS
1001
PERFORM INVERSE DFT SUMMING OVER THE FREQUENCY SUBCARRIER INDICES
1002
ESTIMATE OF CHANNEL RESPONSE IN DELAY AND ANTENNA DOMAINS
1003
TIME INSTANT T2
1010
ESTIMATE OF CHANNEL RESPONSE IN FREQUENCY AND ANTENNA DOMAINS
1011
PERFORM INVERSE DFT SUMMING OVER THE FREQUENCY SUBCARRIER INDICES
1012
ESTIMATE OF CHANNEL RESPONSE IN DELAY AND ANTENNA DOMAINS
1013
PERFORM EXTRAPOLATION TO OBTAIN CHANNEL IMPULSE RESPONSE IN DELAY AND ANTENNA DOMAINS AT TIME > T2
1020
PERFORM DFT SUMMING OVER THE DELAY TAP INDICES
1021
PREDICTED VALUE OF CHANNEL RESPONSE IN FREQUENCY AND ANTENNA DOMAINS
1022

CHANNEL PREDICTION IN DELAY AND ANTENNA DOMAINS
Time T1
1101
SUBCARRIERS
ANT. 1
ANT. 2
INVERSE FFT ALONG SUBCARRIER INDICES (1107)
1102
DELAY TAP
ANT. 1
ANT. 2
Time T2
1103
SUBCARRIERS
ANT. 1
ANT. 2
INVERSE FFT ALONG SUBCARRIER INDICES (1108)
1104
DELAY TAP
ANT. 1
ANT. 2
1105
EXTRAPOLATION
DELAY TAP
ANT. 1
ANT. 2
FFT ALONG DELAY TAP INDICES (1109)
Time > T2
SUBCARRIERS
ANT. 1
ANT. 2
1106

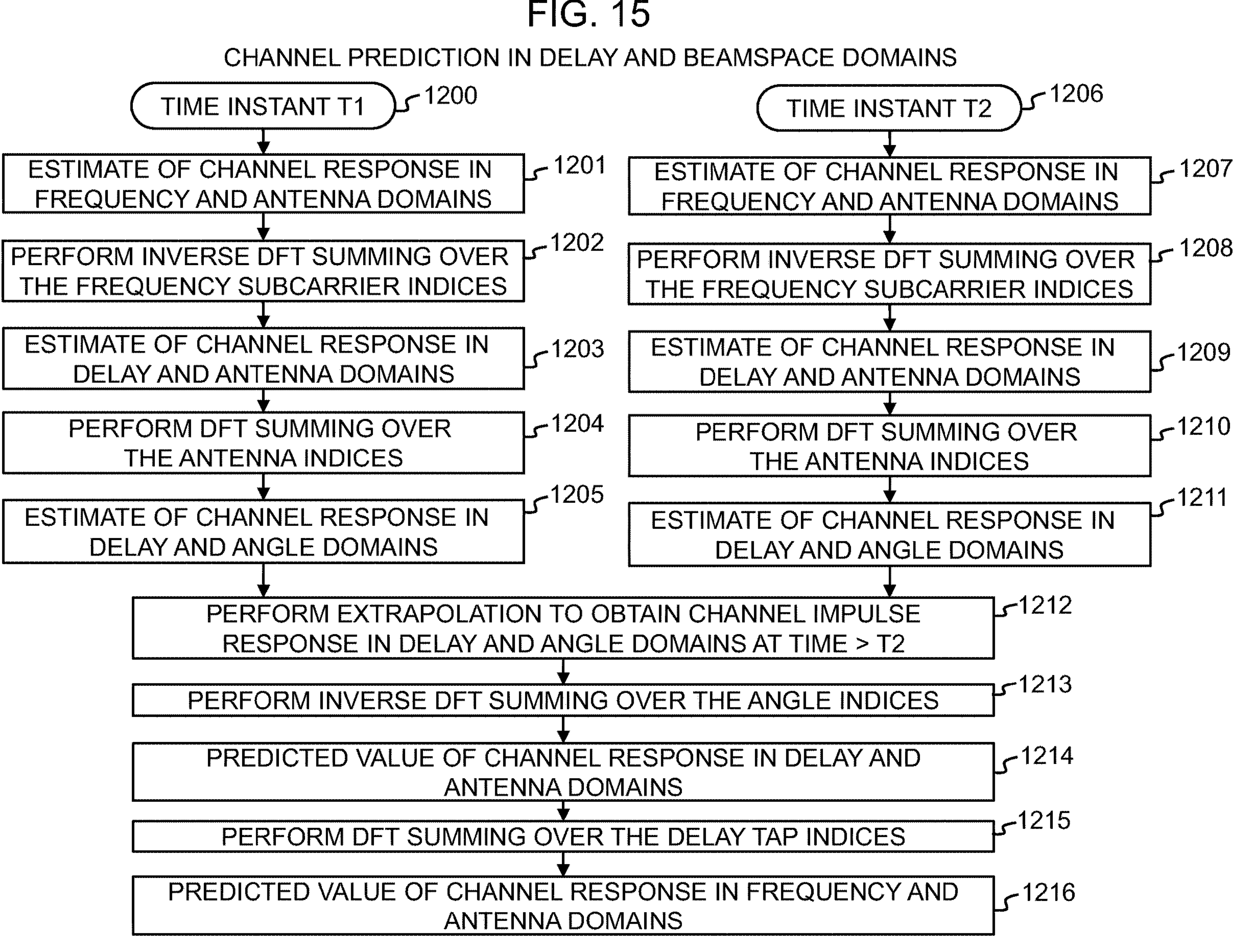
FIG. 15
CHANNEL PREDICTION IN DELAY AND BEAMSPACE DOMAINS
TIME INSTANT T1
1200
ESTIMATE OF CHANNEL RESPONSE IN FREQUENCY AND ANTENNA DOMAINS
1201
PERFORM INVERSE DFT SUMMING OVER THE FREQUENCY SUBCARRIER INDICES
1202
ESTIMATE OF CHANNEL RESPONSE IN DELAY AND ANTENNA DOMAINS
1203
PERFORM DFT SUMMING OVER THE ANTENNA INDICES
1204
ESTIMATE OF CHANNEL RESPONSE IN DELAY AND ANGLE DOMAINS
1205
TIME INSTANT T2
1206
ESTIMATE OF CHANNEL RESPONSE IN FREQUENCY AND ANTENNA DOMAINS
1207
PERFORM INVERSE DFT SUMMING OVER THE FREQUENCY SUBCARRIER INDICES
1208
ESTIMATE OF CHANNEL RESPONSE IN DELAY AND ANTENNA DOMAINS
1209
PERFORM DFT SUMMING OVER THE ANTENNA INDICES
1210
ESTIMATE OF CHANNEL RESPONSE IN DELAY AND ANGLE DOMAINS
1211
PERFORM EXTRAPOLATION TO OBTAIN CHANNEL IMPULSE RESPONSE IN DELAY AND ANGLE DOMAINS AT TIME > T2
1212
PERFORM INVERSE DFT SUMMING OVER THE ANGLE INDICES
1213
PREDICTED VALUE OF CHANNEL RESPONSE IN DELAY AND ANTENNA DOMAINS
1214
PERFORM DFT SUMMING OVER THE DELAY TAP INDICES
1215
PREDICTED VALUE OF CHANNEL RESPONSE IN FREQUENCY AND ANTENNA DOMAINS
1216

CHANNEL PREDICTION IN DELAY AND BEAMSPACE DOMAINS

FIG. 17

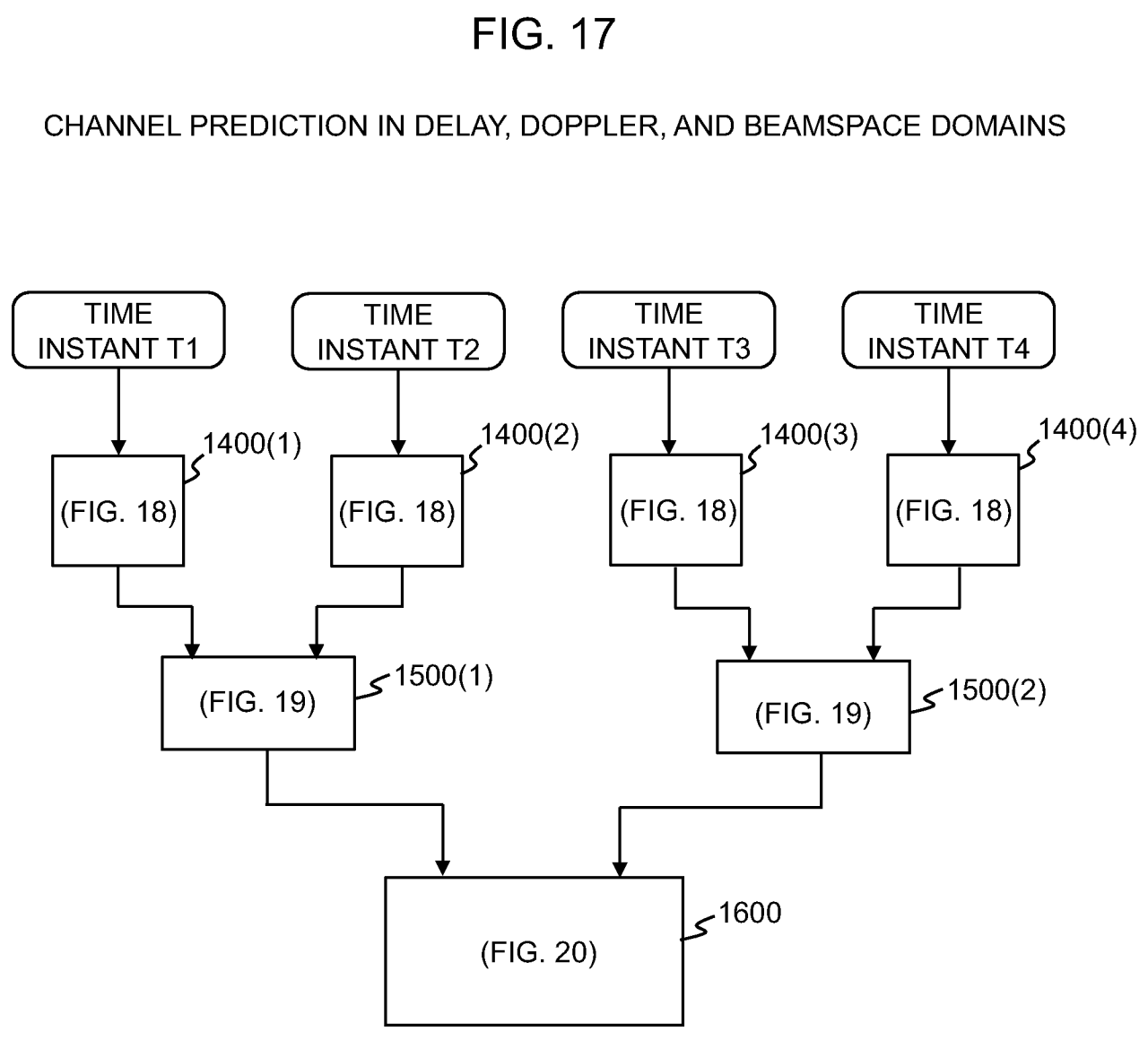

CHANNEL PREDICTION IN DELAY, DOPPLER, AND BEAMSPACE DOMAINS

TIME INSTANT T1
TIME INSTANT T2
TIME INSTANT T3
TIME INSTANT T4
1400(1) (FIG. 18)
1400(2) (FIG. 18)
1400(3) (FIG. 18)
1400(4) (FIG. 18)
1500(1) (FIG. 19)
1500(2) (FIG. 19)
1600 (FIG. 20)

1400
1401
ESTIMATE OF CHANNEL RESPONSE IN FREQUENCY AND ANTENNA DOMAINS
1402
PERFORM INVERSE DFT SUMMING OVER THE FREQUENCY SUBCARRIER INDICES
1403
ESTIMATE OF CHANNEL RESPONSE IN DELAY AND ANTENNA DOMAINS
1404
PERFORM DFT SUMMING OVER THE ANTENNA INDICES
1405
ESTIMATE OF CHANNEL RESPONSE IN DELAY AND ANGLE DOMAINS

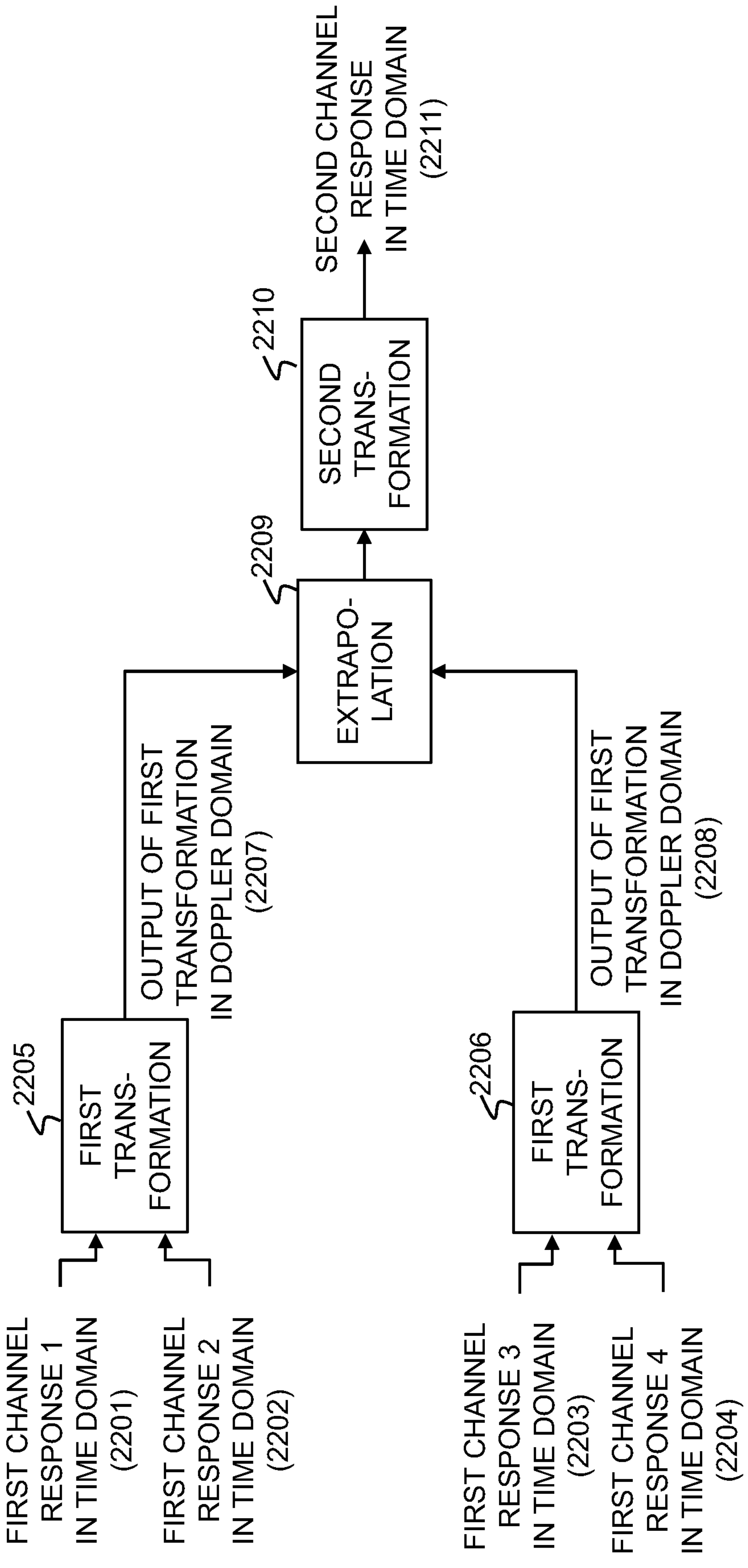
FIG. 22
DOPPLER DOMAIN PREDICTION
FIRST CHANNEL RESPONSE 1 IN TIME DOMAIN (2201)
FIRST CHANNEL RESPONSE 2 IN TIME DOMAIN (2202)
FIRST CHANNEL RESPONSE 3 IN TIME DOMAIN (2203)
FIRST CHANNEL RESPONSE 4 IN TIME DOMAIN (2204)
2205
FIRST TRANS-FORMATION
2206
FIRST TRANS-FORMATION
OUTPUT OF FIRST TRANSFORMATION IN DOPPLER DOMAIN (2207)
OUTPUT OF FIRST TRANSFORMATION IN DOPPLER DOMAIN (2208)
2209
EXTRAPO-LATION
2210
SECOND TRANS-FORMATION
SECOND CHANNEL RESPONSE IN TIME DOMAIN (2211)

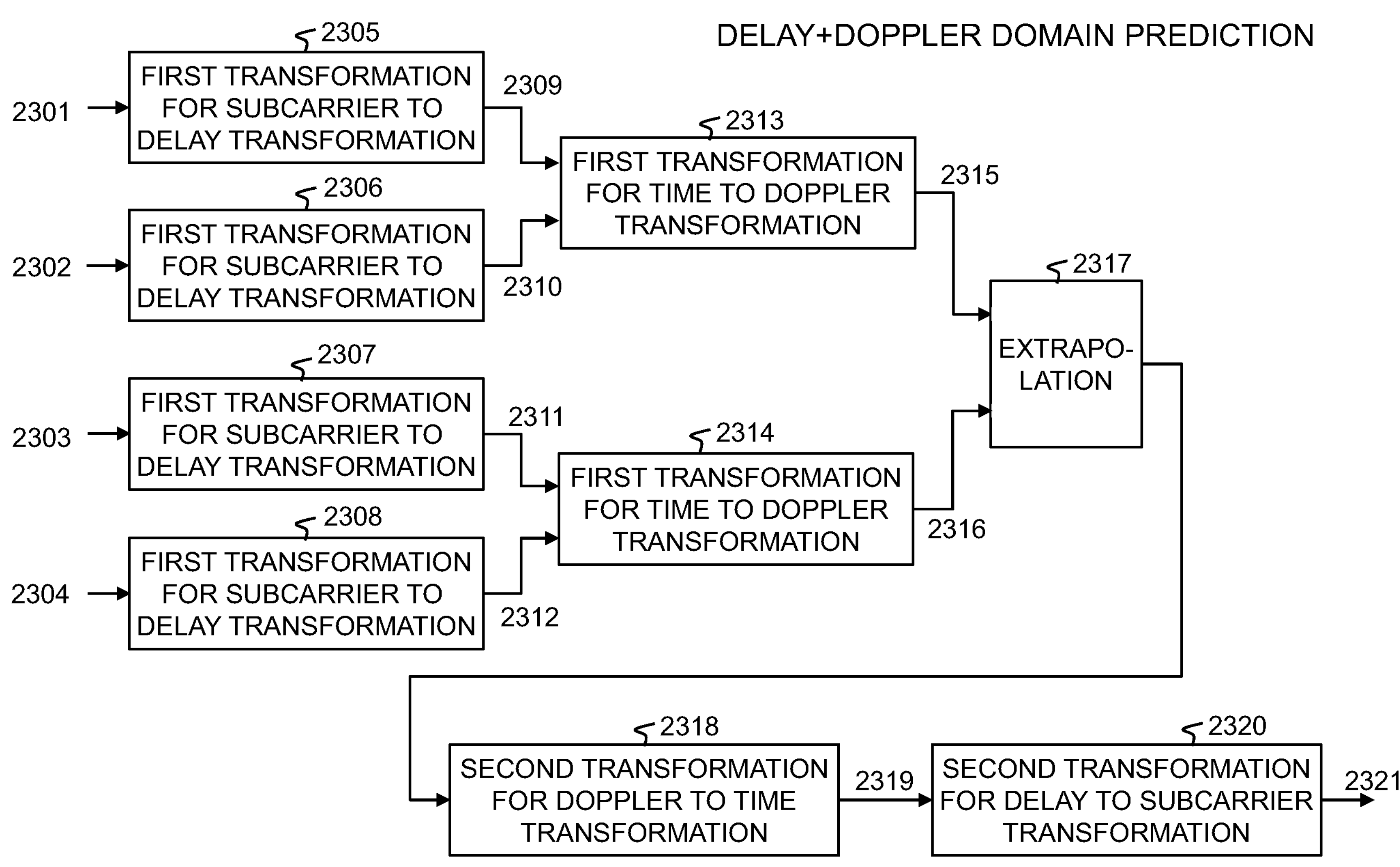
FIG. 23
DELAY+DOPPLER DOMAIN PREDICTION
2301
2302
2303
2304
2305
FIRST TRANSFORMATION FOR SUBCARRIER TO DELAY TRANSFORMATION
2306
FIRST TRANSFORMATION FOR SUBCARRIER TO DELAY TRANSFORMATION
2307
FIRST TRANSFORMATION FOR SUBCARRIER TO DELAY TRANSFORMATION
2308
FIRST TRANSFORMATION FOR SUBCARRIER TO DELAY TRANSFORMATION
2309
2310
2311
2312
2313
FIRST TRANSFORMATION FOR TIME TO DOPPLER TRANSFORMATION
2314
FIRST TRANSFORMATION FOR TIME TO DOPPLER TRANSFORMATION
2315
2316
2317
EXTRAPO-LATION
2318
SECOND TRANSFORMATION FOR DOPPLER TO TIME TRANSFORMATION
2319
2320
SECOND TRANSFORMATION FOR DELAY TO SUBCARRIER TRANSFORMATION
2321

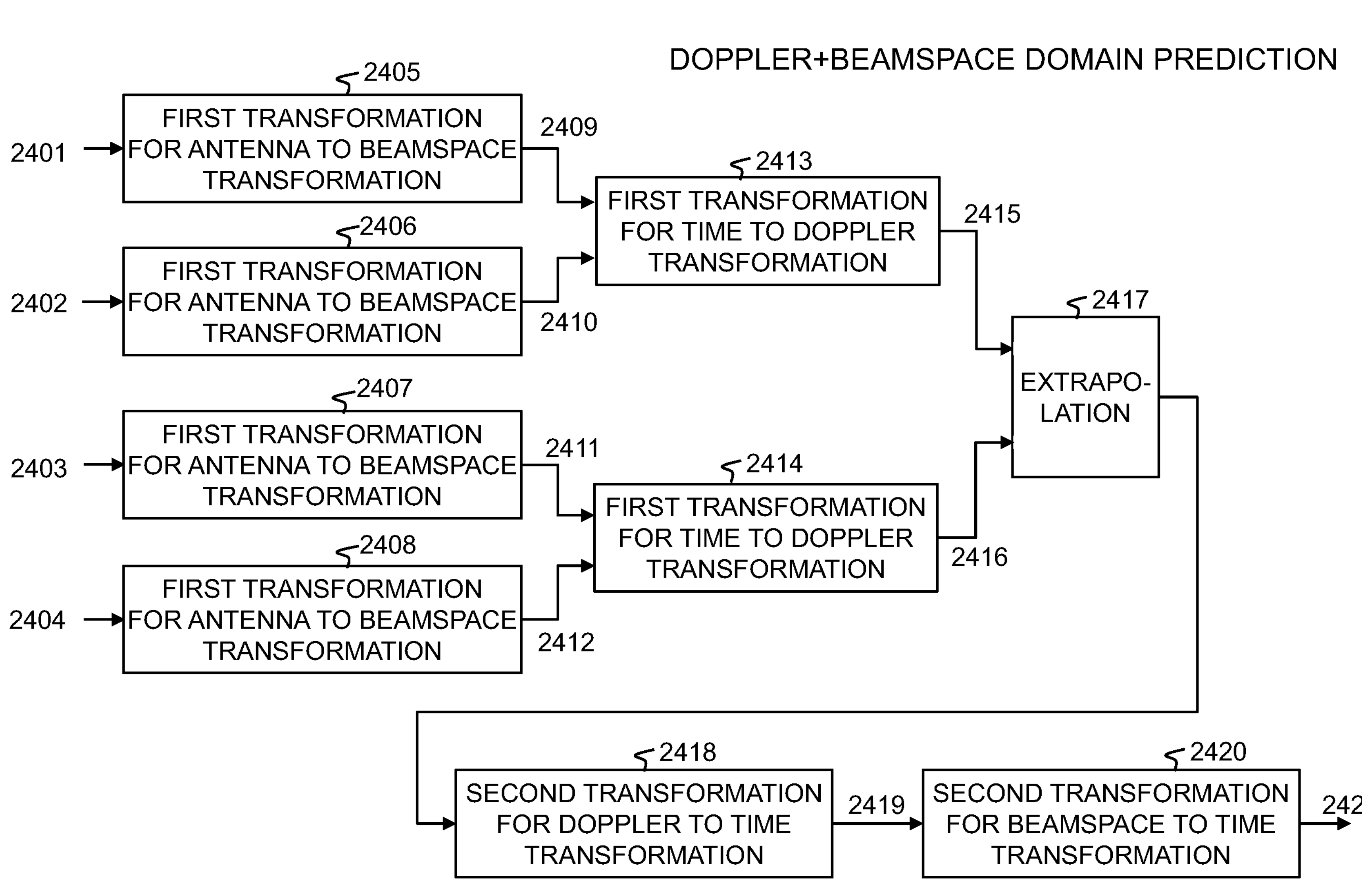
FIG. 24
DOPPLER+BEAMSPACE DOMAIN PREDICTION
2401
2402
2403
2404
2405
FIRST TRANSFORMATION FOR ANTENNA TO BEAMSPACE TRANSFORMATION
2406
FIRST TRANSFORMATION FOR ANTENNA TO BEAMSPACE TRANSFORMATION
2407
FIRST TRANSFORMATION FOR ANTENNA TO BEAMSPACE TRANSFORMATION
2408
FIRST TRANSFORMATION FOR ANTENNA TO BEAMSPACE TRANSFORMATION
2409
2410
2411
2412
2413
FIRST TRANSFORMATION FOR TIME TO DOPPLER TRANSFORMATION
2414
FIRST TRANSFORMATION FOR TIME TO DOPPLER TRANSFORMATION
2415
2416
2417
EXTRAPO-LATION
2418
SECOND TRANSFORMATION FOR DOPPLER TO TIME TRANSFORMATION
2419
2420
SECOND TRANSFORMATION FOR BEAMSPACE TO TIME TRANSFORMATION
2421

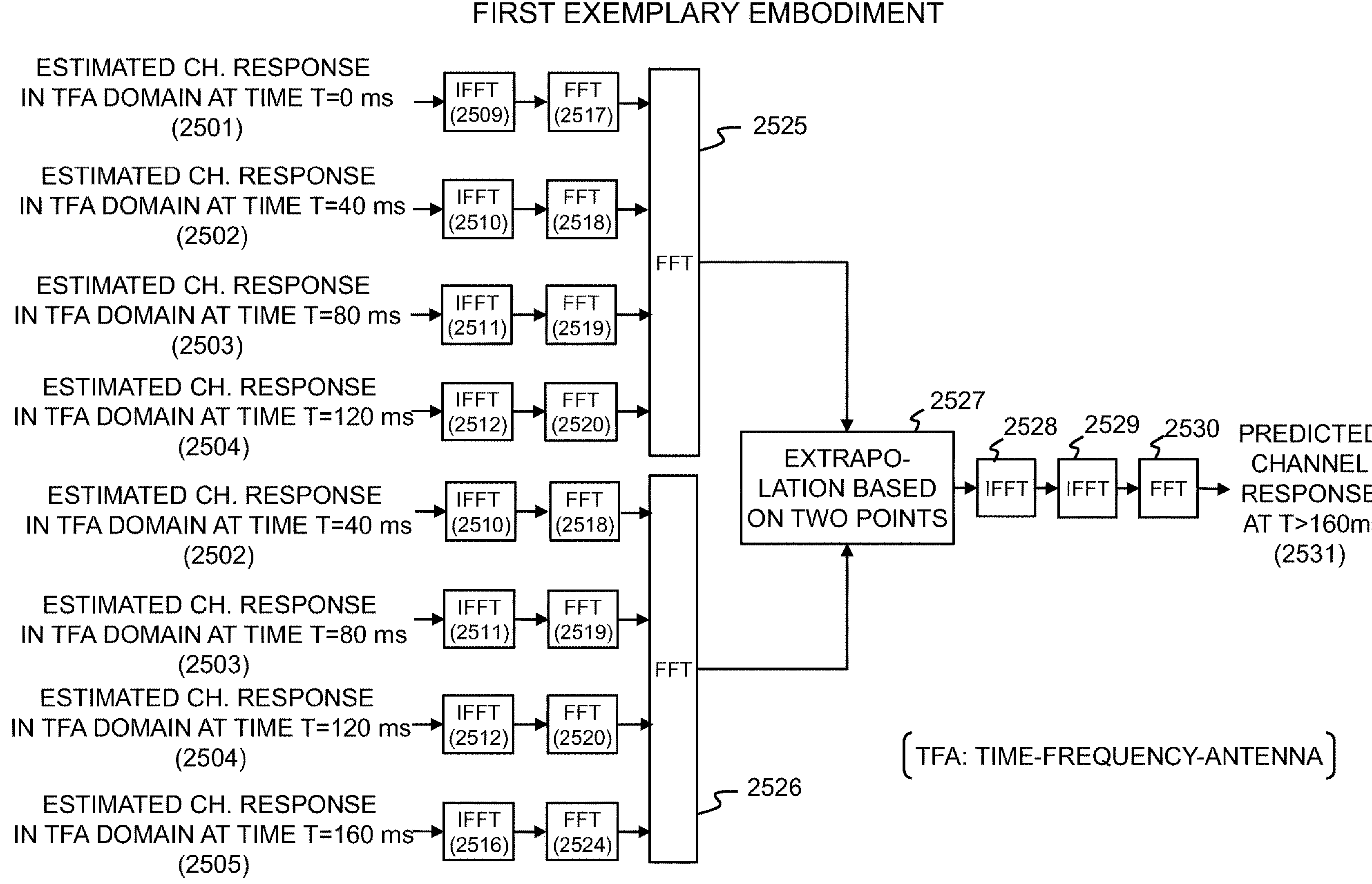
FIG. 25
FIRST EXEMPLARY EMBODIMENT
ESTIMATED CH. RESPONSE IN TFA DOMAIN AT TIME T=0 ms (2501)
ESTIMATED CH. RESPONSE IN TFA DOMAIN AT TIME T=40 ms (2502)
ESTIMATED CH. RESPONSE IN TFA DOMAIN AT TIME T=80 ms (2503)
ESTIMATED CH. RESPONSE IN TFA DOMAIN AT TIME T=120 ms (2504)
ESTIMATED CH. RESPONSE IN TFA DOMAIN AT TIME T=40 ms (2502)
ESTIMATED CH. RESPONSE IN TFA DOMAIN AT TIME T=80 ms (2503)
ESTIMATED CH. RESPONSE IN TFA DOMAIN AT TIME T=120 ms (2504)
ESTIMATED CH. RESPONSE IN TFA DOMAIN AT TIME T=160 ms (2505)
IFFT (2509)
FFT (2517)
IFFT (2510)
FFT (2518)
IFFT (2511)
FFT (2519)
IFFT (2512)
FFT (2520)
IFFT (2510)
FFT (2518)
IFFT (2511)
FFT (2519)
IFFT (2512)
FFT (2520)
IFFT (2516)
FFT (2524)
FFT
2525
FFT
2526
EXTRAPO-LATION BASED ON TWO POINTS
2527
2528
IFFT
2529
IFFT
2530
FFT
PREDICTED CHANNEL RESPONSE AT T>160ms (2531)
TFA: TIME-FREQUENCY-ANTENNA

FIG. 26

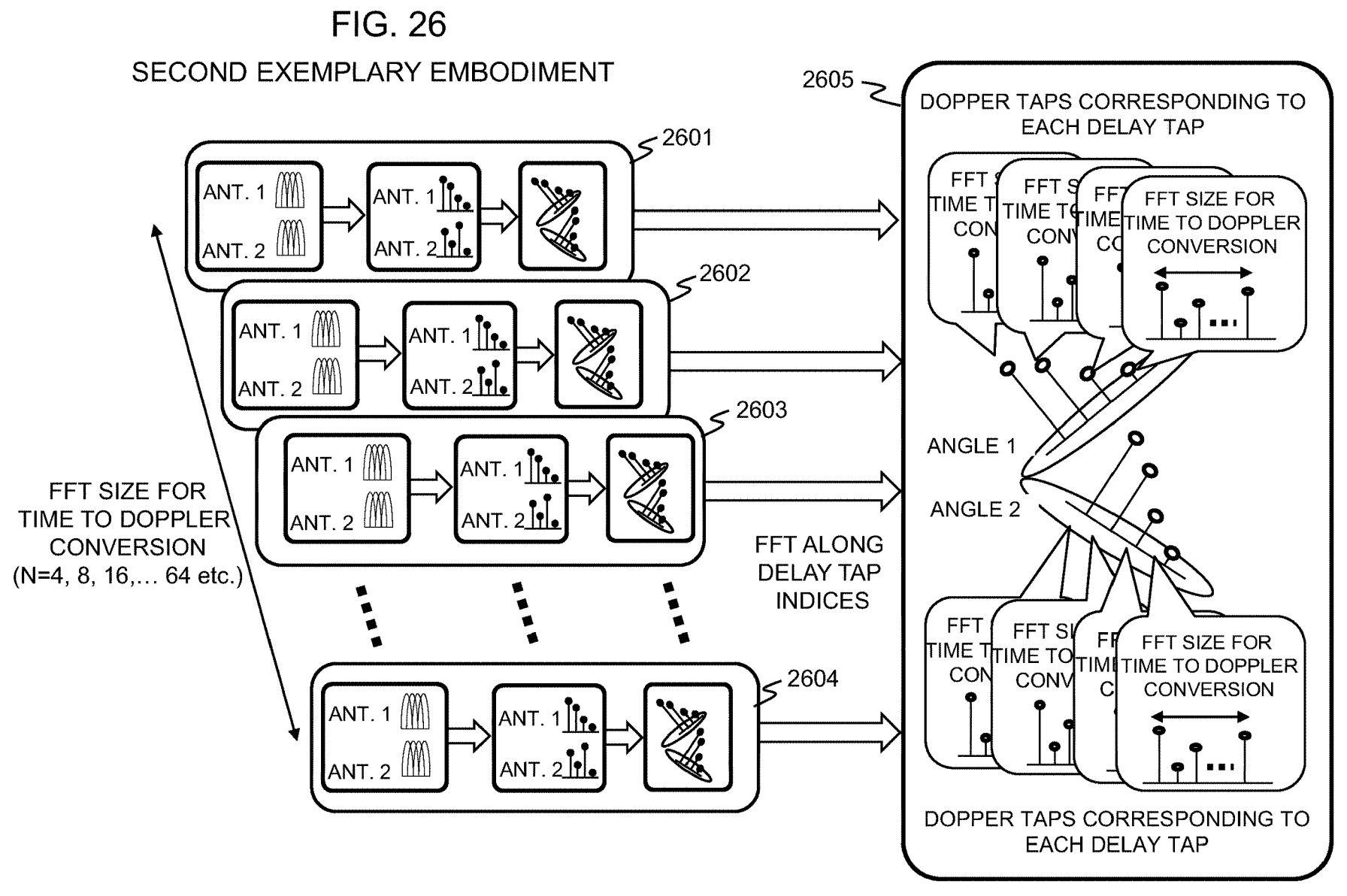

SECOND EXEMPLARY EMBODIMENT 2601
2602
2603
2604
2605

ANT. 1
ANT. 2

FFT SIZE FOR
TIME TO DOPPLER
CONVERSION
(N=4, 8, 16,... 64 etc.)

FFT ALONG
DELAY TAP
INDICES

DOPPER TAPS CORRESPONDING TO
EACH DELAY TAP

FFT SIZE FOR
TIME TO DOPPLER
CONVERSION

ANGLE 1
ANGLE 2

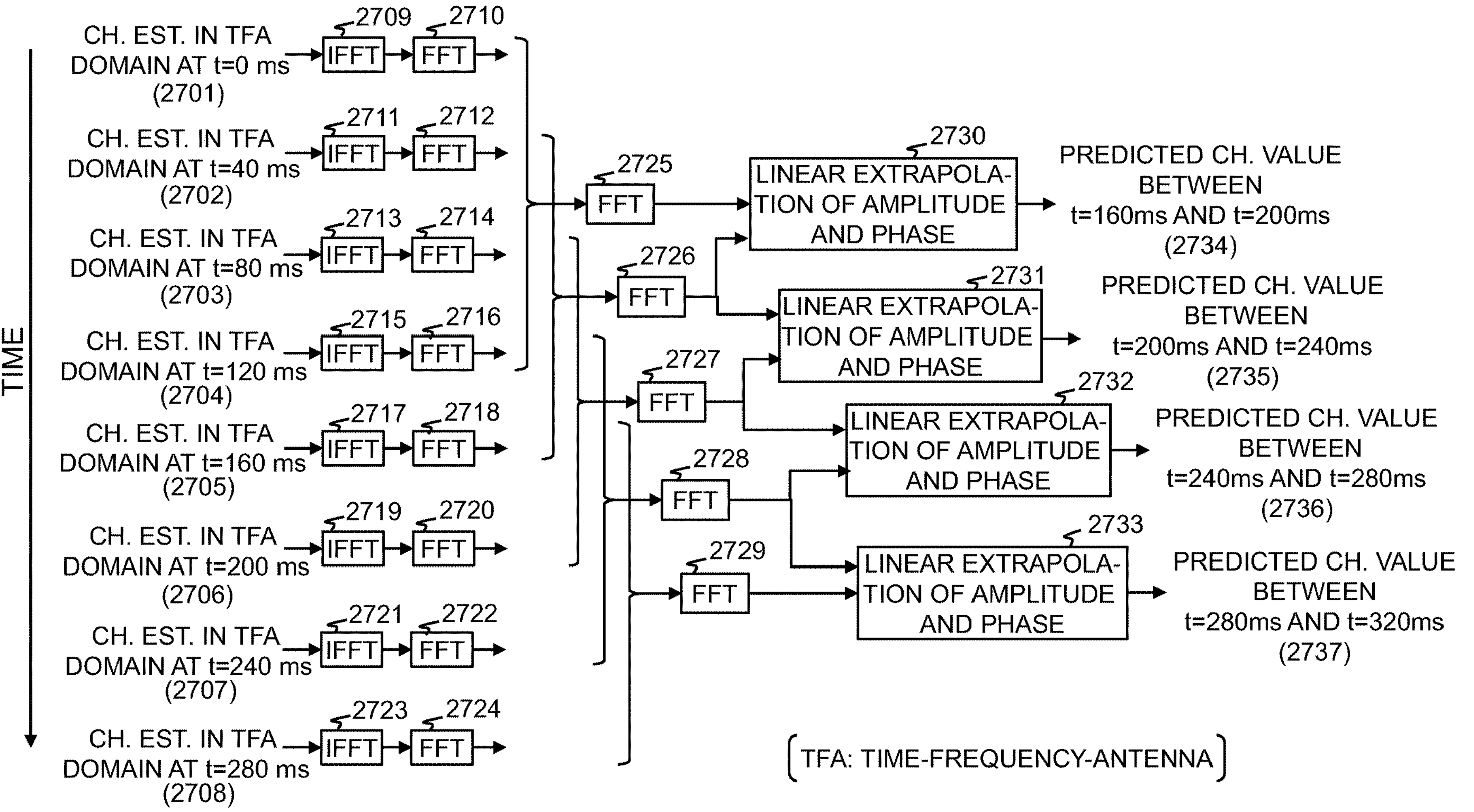
FIG. 27
THIRD EXEMPLARY EMBODIMENT
TIME
CH. EST. IN TFA DOMAIN AT t=0 ms (2701)
CH. EST. IN TFA DOMAIN AT t=40 ms (2702)
CH. EST. IN TFA DOMAIN AT t=80 ms (2703)
CH. EST. IN TFA DOMAIN AT t=120 ms (2704)
CH. EST. IN TFA DOMAIN AT t=160 ms (2705)
CH. EST. IN TFA DOMAIN AT t=200 ms (2706)
CH. EST. IN TFA DOMAIN AT t=240 ms (2707)
CH. EST. IN TFA DOMAIN AT t=280 ms (2708)
2709 IFFT
2710 FFT
2711 IFFT
2712 FFT
2713 IFFT
2714 FFT
2715 IFFT
2716 FFT
2717 IFFT
2718 FFT
2719 IFFT
2720 FFT
2721 IFFT
2722 FFT
2723 IFFT
2724 FFT
2725 FFT
2726 FFT
2727 FFT
2728 FFT
2729 FFT
2730 LINEAR EXTRAPOLA-TION OF AMPLITUDE AND PHASE
2731 LINEAR EXTRAPOLA-TION OF AMPLITUDE AND PHASE
2732 LINEAR EXTRAPOLA-TION OF AMPLITUDE AND PHASE
2733 LINEAR EXTRAPOLA-TION OF AMPLITUDE AND PHASE
PREDICTED CH. VALUE BETWEEN t=160ms AND t=200ms (2734)
PREDICTED CH. VALUE BETWEEN t=200ms AND t=240ms (2735)
PREDICTED CH. VALUE BETWEEN t=240ms AND t=280ms (2736)
PREDICTED CH. VALUE BETWEEN t=280ms AND t=320ms (2737)
(TFA: TIME-FREQUENCY-ANTENNA)

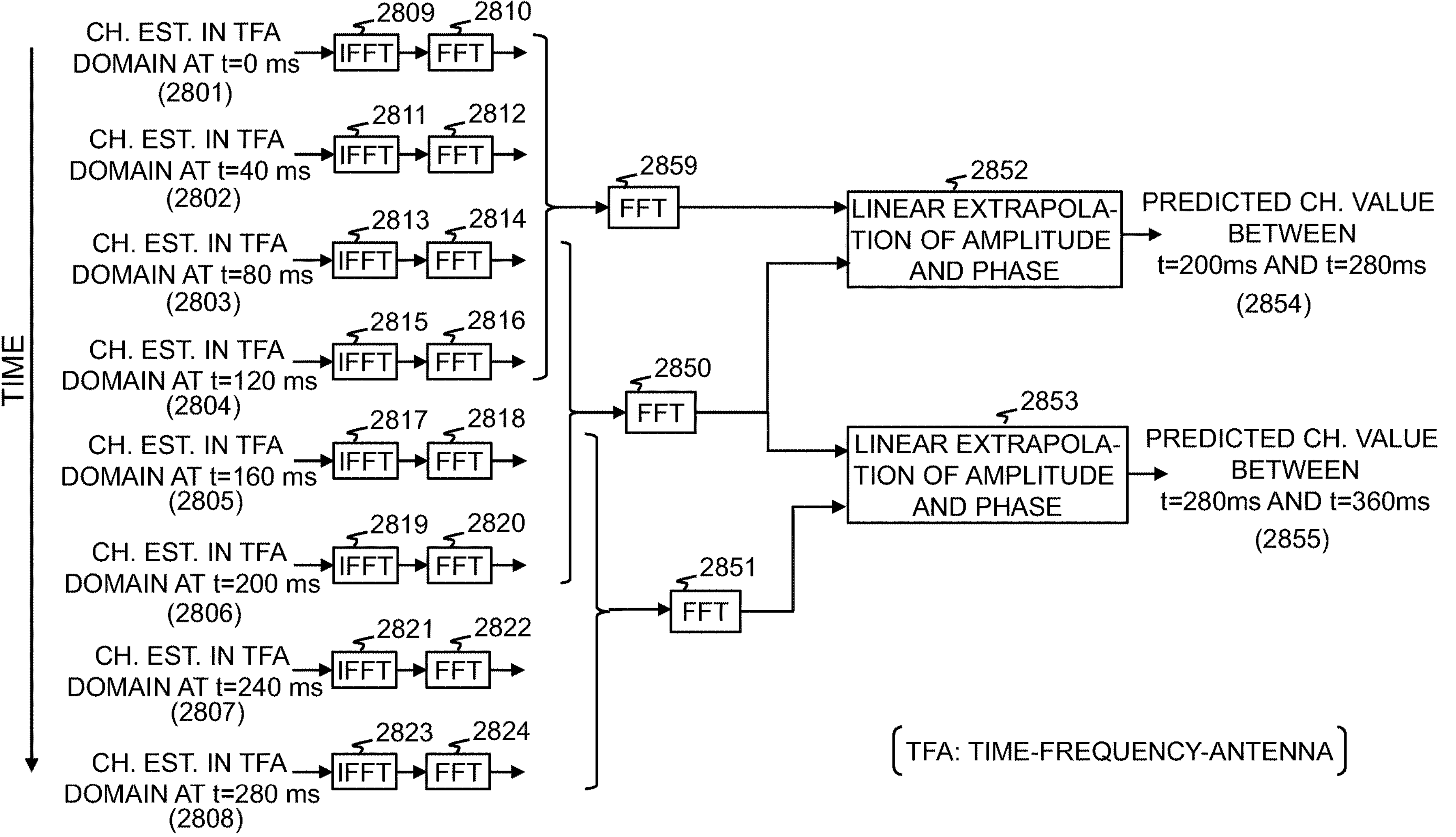
FIG. 28
FOURTH EXEMPLARY EMBODIMENT
TIME
CH. EST. IN TFA DOMAIN AT t=0 ms (2801)
2809
IFFT
2810
FFT
CH. EST. IN TFA DOMAIN AT t=40 ms (2802)
2811
IFFT
2812
FFT
CH. EST. IN TFA DOMAIN AT t=80 ms (2803)
2813
IFFT
2814
FFT
CH. EST. IN TFA DOMAIN AT t=120 ms (2804)
2815
IFFT
2816
FFT
CH. EST. IN TFA DOMAIN AT t=160 ms (2805)
2817
IFFT
2818
FFT
CH. EST. IN TFA DOMAIN AT t=200 ms (2806)
2819
IFFT
2820
FFT
CH. EST. IN TFA DOMAIN AT t=240 ms (2807)
2821
IFFT
2822
FFT
CH. EST. IN TFA DOMAIN AT t=280 ms (2808)
2823
IFFT
2824
FFT
2859
FFT
2850
FFT
2851
FFT
2852
LINEAR EXTRAPOLATION OF AMPLITUDE AND PHASE
PREDICTED CH. VALUE BETWEEN t=200ms AND t=280ms (2854)
2853
LINEAR EXTRAPOLATION OF AMPLITUDE AND PHASE
PREDICTED CH. VALUE BETWEEN t=280ms AND t=360ms (2855)
TFA: TIME-FREQUENCY-ANTENNA

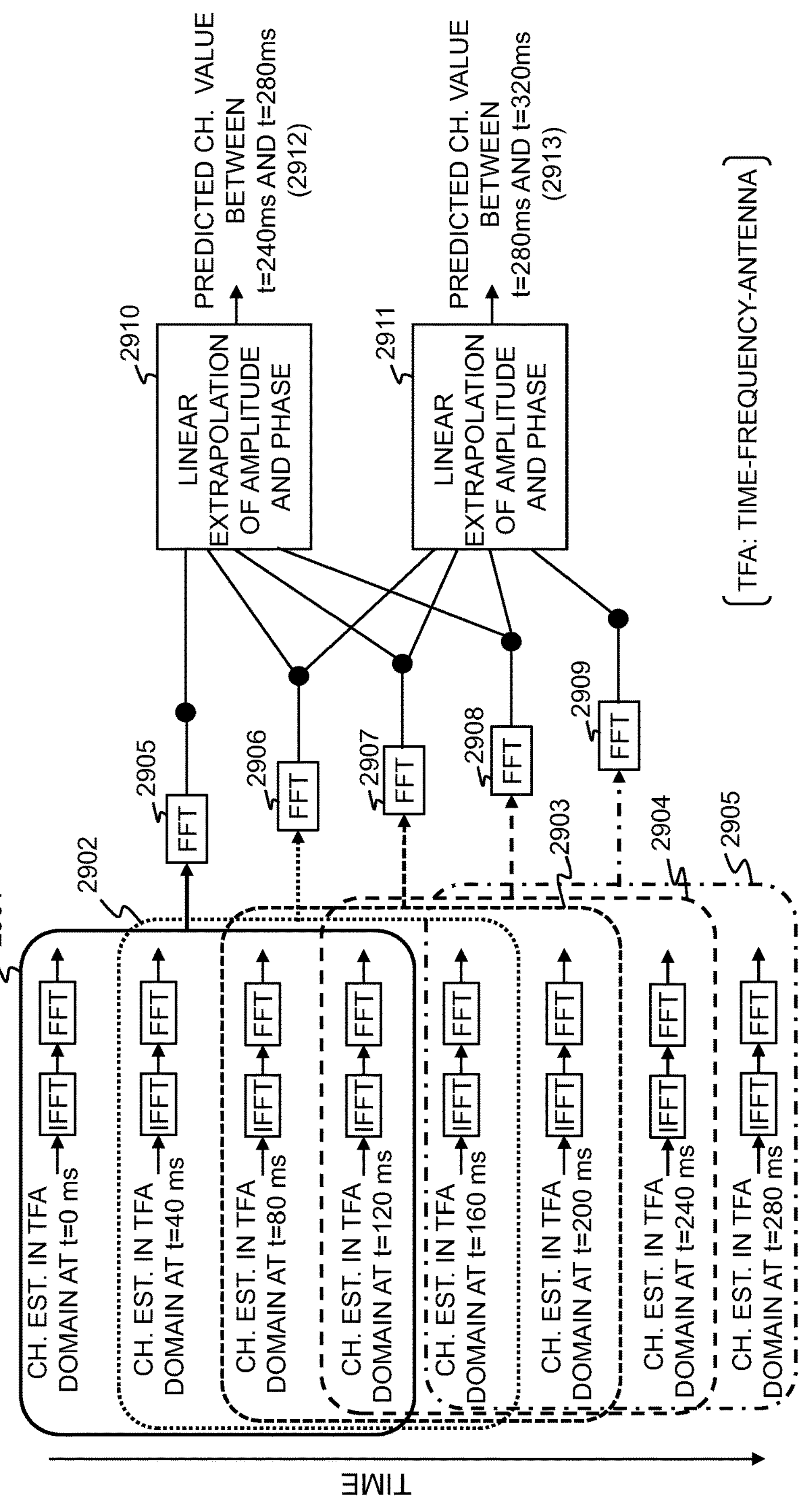
FIG. 29
FIFTH EXEMPLARY EMBODIMENT
2901
2902
2903
2904
2905
CH. EST. IN TFA DOMAIN AT t=0 ms
CH. EST. IN TFA DOMAIN AT t=40 ms
CH. EST. IN TFA DOMAIN AT t=80 ms
CH. EST. IN TFA DOMAIN AT t=120 ms
CH. EST. IN TFA DOMAIN AT t=160 ms
CH. EST. IN TFA DOMAIN AT t=200 ms
CH. EST. IN TFA DOMAIN AT t=240 ms
CH. EST. IN TFA DOMAIN AT t=280 ms
IFFT
FFT
2905
2906
2907
2908
2909
2910
2911
LINEAR EXTRAPOLATION OF AMPLITUDE AND PHASE
PREDICTED CH. VALUE BETWEEN t=240ms AND t=280ms (2912)
PREDICTED CH. VALUE BETWEEN t=280ms AND t=320ms (2913)
TFA: TIME-FREQUENCY-ANTENNA
TIME

ANOTHER EXEMPLARY EMBODIMENT

CHANNEL PREDICTION IN SUBCARRIER AND ANTENNA DOMAINS
(NO TRANSFORMATION)

CHANNEL PREDICTION IN SUBCARRIER AND ANTENNA DOMAINS (NO TRANSFORMATION)

METHOD AND DEVICE FOR CHANNEL PREDICTION IN WIRELESS COMMUNICATION SYSTEMS

BACKGROUND OF THE INVENTION

The present invention relates to techniques for predicting the channel response of a wireless communication channel.

A typical wireless communication channel between a transmitter and a receiver may be represented by a random time-varying impulse response, a detailed description of which can be found in Non patent literature 1 (A. Goldsmith, Wireless Communications. Cambridge, U.K.: Cambridge Univ. Press, 2005). To expound a little more, a single pulse transmitted over a multipath wireless channel may be received as a train of pulses, wherein each pulse in the train denotes one multipath component. Each multipath component may experience events like reflection, refraction or scattering from the surrounding scatterers in the transmission path, thus undergo phase changes, leading to their constructive or destructive addition at the receiver. Such a phenomenon may be called multipath fading.

Furthermore, each multipath component may reach the receiver with different time delays. The knowledge of the instantaneous channel condition can be exploited effectively to improve communication performance. More specifically, the capacity of the fading channel may depend on the knowledge about the time-varying wireless channel at the transmitter and/or receiver. For example, the channel information at the transmitter is extremely useful for employing performance enhancing techniques, including but not limited to, power allocation, beamforming or scheduling operations.

Acquiring knowledge about the time-varying channel can be done by a method like channel estimation. In one such method, a reference signal already known to the receiver may be transmitted by the transmitter, enabling the receiver to compute the channel transfer function, more specifically, impulse response or frequency response of the channel. Furthermore, there are techniques to obtain the knowledge about channel response at the transmitter side: for example, employing a time division duplexing (TDD) method or a frequency division duplexing (FDD) method.

In one exemplary form of communication, signal transmission and reception between a base station (BS) and a mobile user equipment (UE) may be considered. In such a scenario, the signal transmission from the UE to BS may be called as uplink (UL) communication, while that from the BS to the UE may be called downlink (DL) communication. It is known that in the TDD method, the UL communication channel and the DL communication channel may follow channel reciprocity, thus enabling the estimated channel response in UL channel be exploited for DL transmission. Not restricted to TDD, there may be techniques to achieve channel reciprocity in FDD method as well, for example, by employing a frequency correction algorithm based on channel characteristics, including but not limited to direction of arrival, channel covariance matrix or channel space-time correlation etc.

However, in many practical communication systems, there may be a time gap between the UL channel estimation instant and the DL transmission instant. It is possible that the time-varying wireless channel changes in this duration, which can introduce inaccuracy in the performance-enhancing techniques employed in DL transmission based on the estimated UL channel response as described in Non patent literature 2 (A. Duel-Hallen, Shengquan Hu and H, Haven, "Long-range prediction of fading signals," in *IEEE Signal Processing Magazine*, vol. 17, no. 3, pp. 62-75, May 2000, del: 10.1109/79.841729).

BRIEF SUMMARY OF THE INVENTION

In a typical multi-user multiple-input multiple-output (MU-MIMO) communication system, a BS may need the DL channel information corresponding to each UE. For example, such channel information may be efficiently used to suppress the interference occurring between multiple users or multiple transmission streams. Precise knowledge of the DL channel information at the time of downlink transmission may lead to accurate interference-cancellation operation by correct beamforming weight calculation. However, there may be a time delay between the time instant at which channel estimation is performed at the BS and the time instant at which DL signal transmission takes place. It may happen that a time-varying wireless channel response changes during this interval. Hence, an older value of channel information may get used for beamforming weight calculation. Such inaccurate beamforming weight used in downlink transmission can result in throughput degradation due to the reasons discussed earlier.

Specifically, the 3$^{rd}$ generation partnership project (3GPP) has decided to work on the evolution of MIMO in the 3GPP Release 18. In practical implementations of an MU-MIMO system, performance degradation may occur due to the use of outdated channel response in the downlink transmission from a base station (BS) to a user equipment (UE) when the UE is moving with medium to high velocity.

An exemplary object of the present disclosure is to predict the channel response (for example, channel impulse response, or channel frequency response, or some variant that contains information related to the channel) at the time of signal transmission.

According to an aspect of the present disclosure, a communication device includes: a wireless transceiver configured to communicate with another communication device through a wireless channel; and at least one processor configured to execute instructions to: a) estimate at least one first channel response of the wireless channel based on a predetermined signal received from the another communication device; b) predict a second channel response based on the at least one first channel response by an extrapolation method for signal transmission to the another communication device at a time instant where no channel estimation is performed.

According to another aspect of the present disclosure, a channel prediction method by a processor in a communication device that is configured to communicate with another communication device through a wireless channel, includes: a) estimating at least one first channel response of the wireless channel based on a predetermined signal received from the another communication device; and b) extrapolating the at least one first channel response to obtain a second channel response by an extrapolation method for signal transmission to the another communication device at a time instant where no channel estimation is performed.

As described above, according to the present disclosure, the second channel response of the wireless channel can be predicted at the time of signal transmission. Accordingly, using such a predicted channel response at the time instant of signal transmission, accurate signal transmission can be achieved.

The disclosure accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the disclosure will be indicated in the claims. In addition to the objects mentioned, other obvious and apparent advantages of the disclosure will be reflected from the detailed specification and drawings.

BRIEF DESCRIPTION OF DRAWINGS

FIG. 2 is a diagram illustrating an operation of downlink transmission from BS to UE in a wireless communication system to which an exemplary embodiment of the present disclosure is applied.

FIG. 5 is a schematic diagram illustrating a proposed solution to the problem of calculation of downlink beamforming weights, according to an exemplary embodiment of the present disclosure.

FIG. 7 is a graph illustrating an example of channel gains at different angles of each multipath component for explaining a multipath resolution according to an exemplary embodiment of the present disclosure.

FIG. 10 is a schematic diagram illustrating a functional configuration of a BS device according to an exemplary embodiment of the present disclosure.

FIG. 13 is a flowchart illustrating operations for channel prediction in delay and antenna domains, according to an exemplary embodiment of the present disclosure.

FIG. 15 is a flowchart illustrating operations for channel prediction in delay and beamspace domain, according to an exemplary embodiment of the present disclosure.

FIG. 17 is a flowchart illustrating operations for channel prediction in delay-Doppler-beamspace domain, according to an exemplary embodiment of the present disclosure.

FIG. 22 is a block diagram illustrating operations for channel prediction in Doppler domain, according to an exemplary embodiment of the present disclosure.

FIG. 23 is a block diagram illustrating operations for channel prediction in delay-Doppler domain, according to an exemplary embodiment of the present disclosure.

FIG. 24 is a block diagram illustrating operations for channel prediction in beamspace-Doppler domain, according to an exemplary embodiment of the present disclosure.

FIG. 25 is a block diagram illustrating operations of channel prediction according to a first exemplary embodiment of the present disclosure.

FIG. 26 is a block diagram illustrating operations of channel prediction according to a second exemplary embodiment of the present disclosure.

FIG. 27 is a block diagram illustrating operations of channel prediction according to a third exemplary embodiment of the present disclosure.

FIG. 28 is a block diagram illustrating operations of channel prediction according to a fourth exemplary embodiment of the present invention.

FIG. 29 is a block diagram illustrating operations of channel prediction according to a fifth exemplary embodiment of the present disclosure.

DETAILED DESCRIPTION OF THE INVENTION

Hereinafter, the word "exemplary" is used herein to mean "serving as an example, instance, or illustration". Any embodiment described herein as "exemplary" is not necessarily to be construed as preferred or advantageous over other embodiments.

1. Outline of Exemplary Embodiments

The technical problems of the background art as discussed earlier can be solved by predicting the impulse response or frequency response of a time-varying wireless channel at a time instant of signal transmission based on the past events of channel estimation. Predicting the impulse response or frequency response of the channel can be done by an extrapolation operation. More specifically, it may be possible to obtain the impulse response or frequency response of the channel at a time instant of signal transmission by using two or more impulse responses or frequency responses from the past events of channel estimation.

Such a prediction method may be realized by resolving multipath components and then performing the extrapolation operation on each multipath component. The separation of multipath components may be performed based on their differences in at least one of delays, angles, or Doppler frequencies.

Accordingly, the predicted channel response of the wireless channel can be used to perform accurate signal transmission at the time instant.

Further, the predicted channel response of the wireless channel can be used to compute accurate beamforming weights corresponding to the timing of transmission. Furthermore, it is possible to compensate for performance degradation (in terms of metrics like user throughput among many others) that occurs when the beamforming weights are computed using old and obsolete channel information.

It should be noted that for the extrapolation operation, methods including but not limited to linear extrapolation, linear regression, least-square estimation, non-linear regression, polynomial regression, spline regression, curve fitting etc. may be adopted, and all occurrences of the word "extrapolation" anywhere in this disclosure may be construed to be inclusive of these methods. Hereafter, the outline of a channel prediction method according to the present exemplary embodiments will be described by referring to FIGS. 1-10.

1.1) System Configuration

Figure 1:
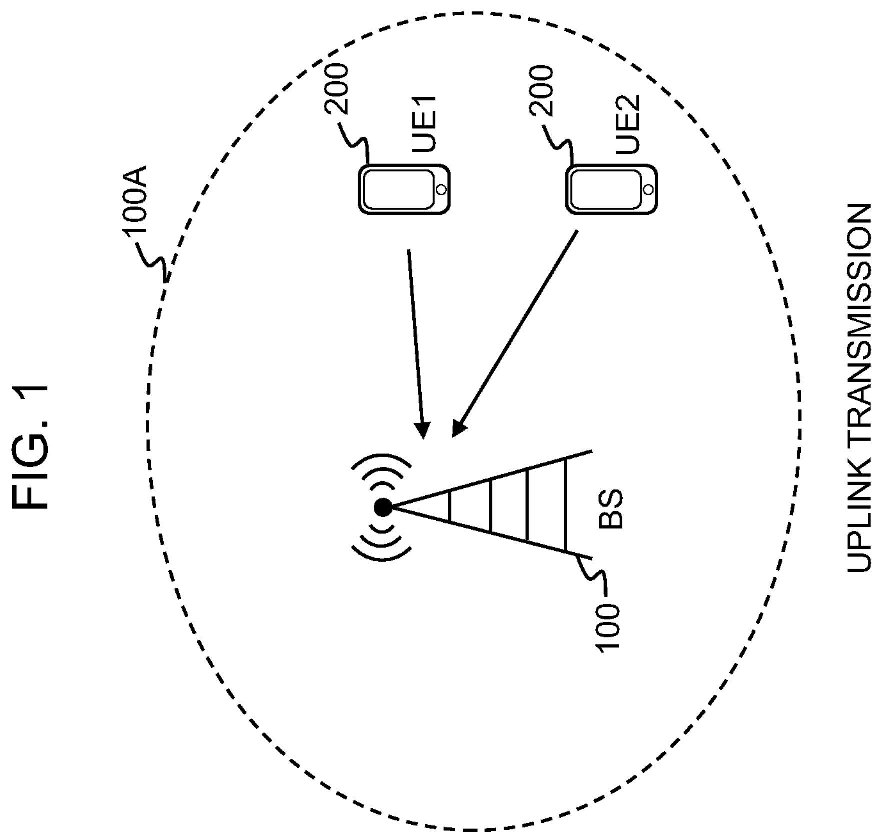
FIG. 1 is a diagram illustrating an operation of uplink transmission from a UE to a BS in a wireless communication system to which an exemplary embodiment of the present disclosure is applied.
Figure 2:
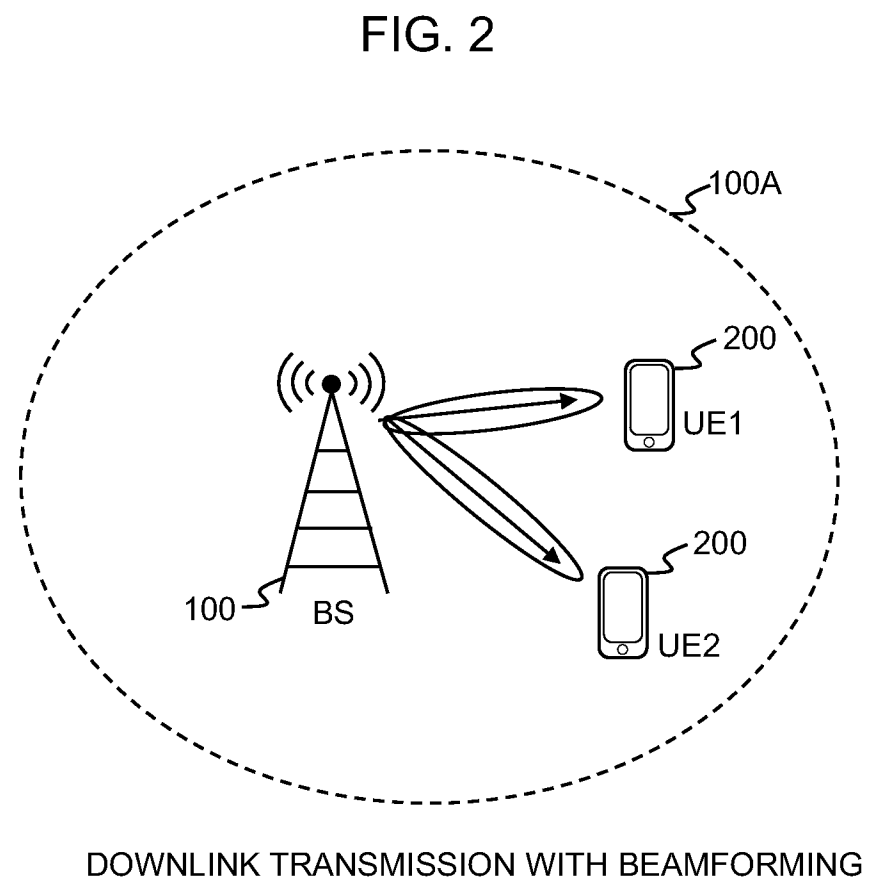

As illustrated in FIGS. 1 and 2, a wireless communication system is composed of a plurality of communication devices where a specific communication device such as a base station or an access point may communicate with other communication devices. For simplicity, it is assumed that a BS device 100 is capable of communicating with a plurality of UE terminals 200 including two UE terminals UE1 and UE2. The UE terminals UE1 and UE2 are located within a radio coverage area (cell) 100A formed by the BS 100, allowing each UE terminal to perform uplink (UL) transmission and the BS device 100 to perform downlink (DL) transmission with beamforming.

Beamforming techniques are employed by multi-antenna transmitters to provide directivity to a transmission, and thus enabling spatial multiplexing of a plurality of signals. Such mechanism can be used for a multi-user MIMO system such that a multi-antenna BS (BS device 100) can simultaneously transmit a plurality of signals destined for different users (UE terminals 200). Beamforming can be implemented by analog or digital methods. In an analog beamforming method, different amplifiers and phase-shifters may be used for the same analog signal in radio frequency to vary their amplitude and phase corresponding to each transmit antenna. Thus, power variation and beam steering become possible.

Alternatively, in digital beamforming, different digital baseband signals may be constructed for each transmit antenna by multiplying with different weight coefficients. For digital beamforming, the transmitter of the BS device 100 may need information about the channel between itself and the receiver of each UE terminal 200, to design effective beamforming weight. For obtaining the channel information, techniques like channel estimation may be employed. In a typical channel estimation technique, a known reference signal may be transmitted from the UE terminal 200 to the BS device 100. The BS device 100 may use this known reference signal to compute the channel impulse response or frequency response.

1.2) Performance Degradation

Sending the known reference signal too often can increase the overhead and reduce the opportunity for actual data communication. However, if the channel estimation is performed at large time intervals, then the condition of the time-varying wireless channel may change in the meantime, which can make the channel estimation information obsolete at the time of next transmission. Such a situation is illustrated in FIG. 3.

Figure 3:
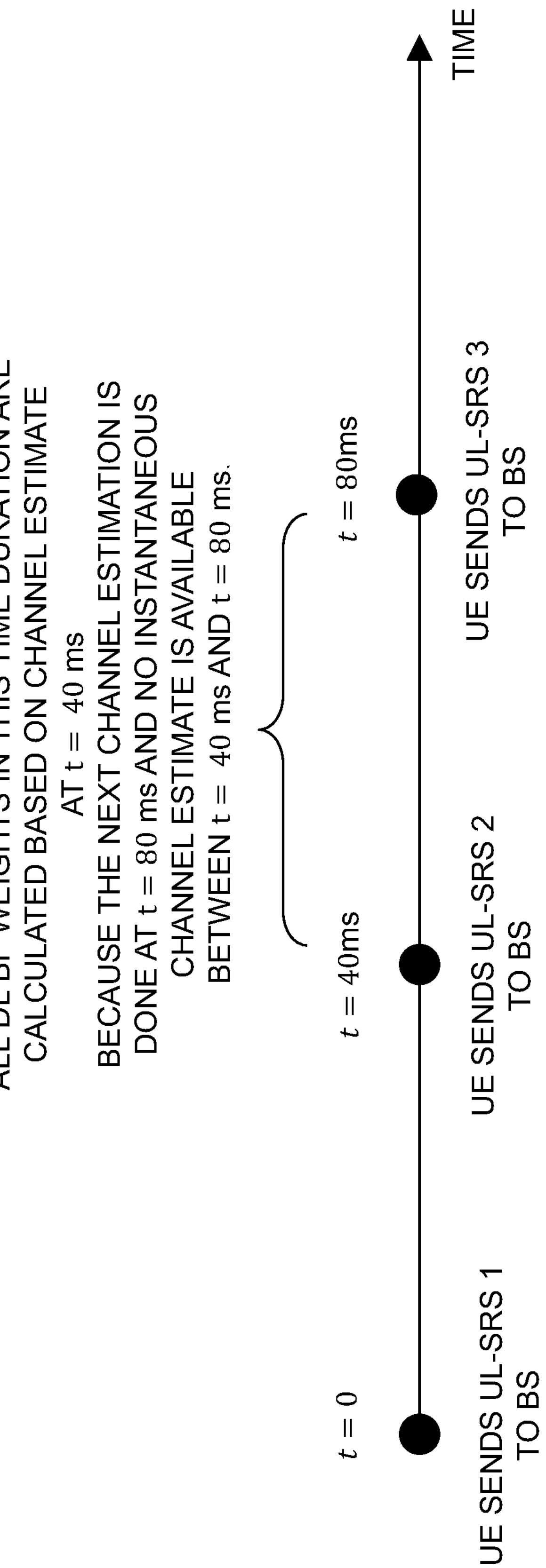
FIG. 3 is a schematic diagram illustrating the problem of calculation of downlink beamforming weights that causes channel aging in a wireless communication system.

In FIG. 3, the UE terminal 200 sends an uplink sounding reference signal (UL-SRS) to the BS device 100 at intervals of 40 ms (milliseconds). The BS device 100, each time receiving each UL-SRS, calculates the digital beamforming (BF) weight based on channel estimation. If the UE terminal 200 is moving at high speeds or for other reasons contributing to wireless channel variation, the condition of the wireless channel between the BS device 100 and the UE terminal 200 may change for a duration of 40 ms, but the BS device 100 has to use the beamforming weight calculated at the preceding channel estimation event. Accordingly, the BS device 100 may use the obsolete channel estimation results to compute digital beamforming weights, resulting in inaccurate weight calculation. Inaccurate beamforming weights can result in performance degradation caused by factors such as inefficient interference cancellation between the spatially multiplexed streams and interference between users.

Figure 4:
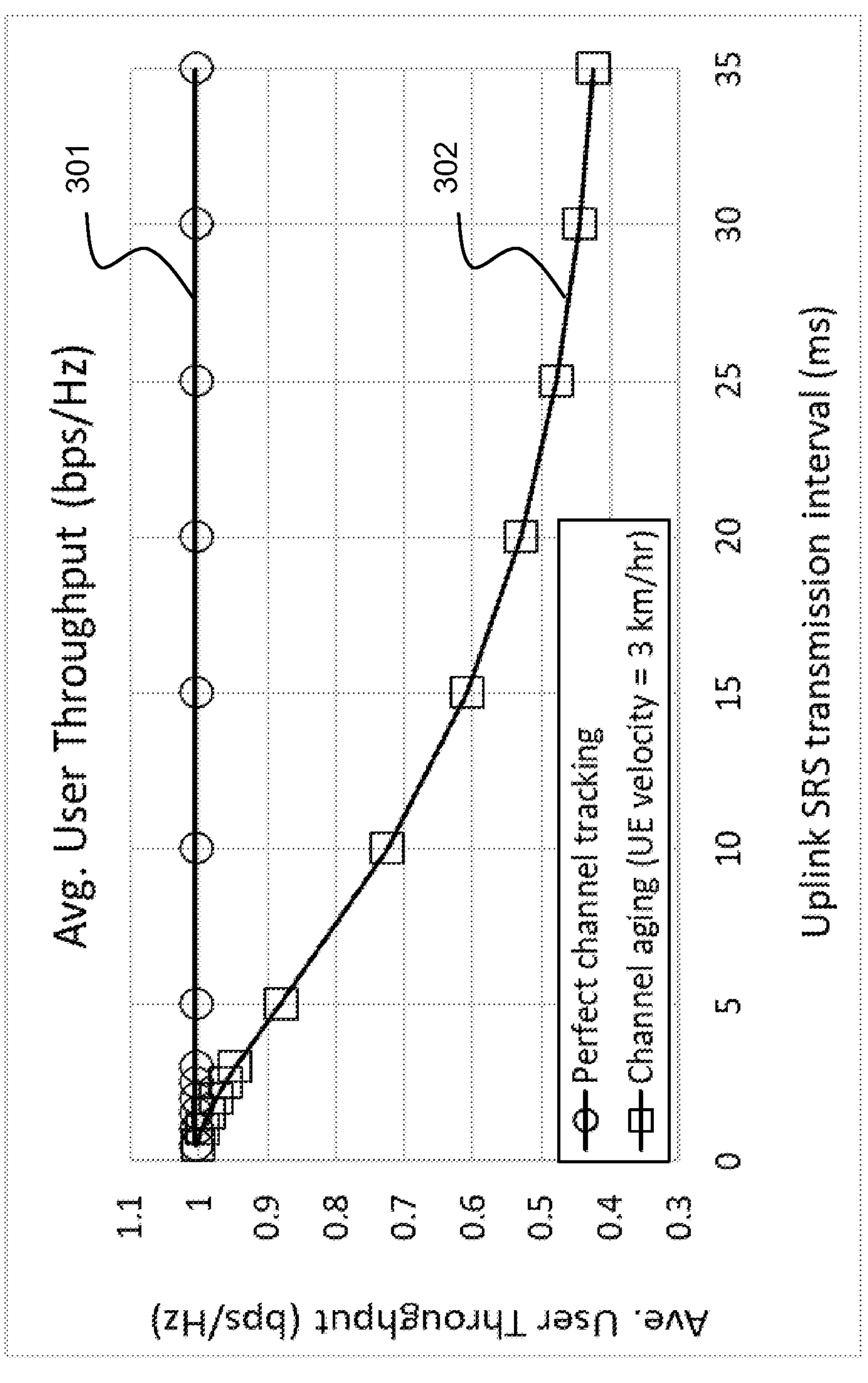
FIG. 4 is a representative plot of average user throughput against uplink sounding reference signal (SRS) transmission interval demonstrating the performance degradation caused by aging of wireless channel.

As illustrated in FIG. 4, an exemplary performance degradation scenario is presented. In FIG. 4, the average user throughput in bits/sec/Hz is plotted against the time interval between two successive transmissions of uplink sounding reference signal (SRS) in millisecond. The UE terminal 200 is assumed to be moving at a velocity of 3 km/hr. It is observed that there is no degradation in average user throughput when the channel is perfectly tracked at the BS device 100 (as shown by 301), meaning, the channel response is perfectly known to the BS device 100. This happens because the BS device 100 can compute accurate beamforming weights for downlink transmission using the exact value of channel impulse response or channel frequency response, resulting in efficient interference cancellation between spatially multiplexed streams and users.

However, in the case where the perfect channel tracking is not possible, the time-varying wireless channel changes between the time instant at which the beamforming weights are computed and the time instant at which downlink transmission occurs. Thus, because of channel aging and inaccurate beamforming weights, the average user throughput is found to degrade which is shown by 302.

1.3) Proposed Solution

It may be possible to solve this problem by predicting the impulse response or frequency response of the channel (collectively referred to herein as channel response) between two successive events of channel estimation. More specifically, the channel response may be predicted at the exact timing of downlink transmission, based on which the downlink beamforming weights can be calculated. The proposed solution to the problem will be described by referring to FIG. 5.

As illustrated in FIG. 5, the UE terminal 200 sends a UL-SRS as a reference signal at predetermined intervals which can be periodic (e.g. 40 ms) or aperiodic as well. Each time the BS device 100 receives the UL-SRS, a channel response between the UE terminal 200 and the BS device 100 is computed by channel estimation using the UL-SRS as denoted by reference numerals 401, 402 and 403.

In addition, when the channel response has been computed by channel estimation, the BS device 100 performs channel prediction using an extrapolation operation to compute a channel response based on channel responses obtained by the channel estimation. For instance, when receiving the UL-SRS 2 at the time instant t2, the BS device 100 computes channel responses at time instants $t2_1$, $t2_2$, . . . based on two or more channel responses obtained by the channel estimation (e.g. 401 and 402). When receiving the UL-SRS 3 at the time instant t3, the BS device 100 performs the channel prediction in the same manner.

The extrapolation operation may be performed by at least one extrapolation method such as a linear extrapolation, linear regression, least-square estimation, non-linear regression, polynomial regression, spline regression and curve fitting.

As described above, predicting the channel response of a time-varying wireless channel can be done by the extrapolation operation. More specifically, it may be possible to obtain the channel response at a time instant where no channel estimation is performed by using two or more channel responses from the past events of channel estimation. For example, in the case of using two channel estimation events of the past, the channel responses obtained by channel estimation at time instants t1 and t2 may be extrapolated to predict the channel responses at time instants $t2_1$, $t2_2$, . . . .

Hereafter, without loss of generality, a channel response obtained by channel estimation based on a reference signal may be referred to as an estimated channel response as appropriate. On the other hand, a channel response obtained by channel prediction based on previously obtained channel responses may be referred to as a predicted channel response as appropriate. In generality, an input of the prediction process may be referred to as first channel response and an output of the prediction process may be referred to as second channel response. Note that prediction of channel response (impulse response or frequency response) may comprise of predicting the amplitude and phase.

<Multipath Propagation Environment>

Figure 6:
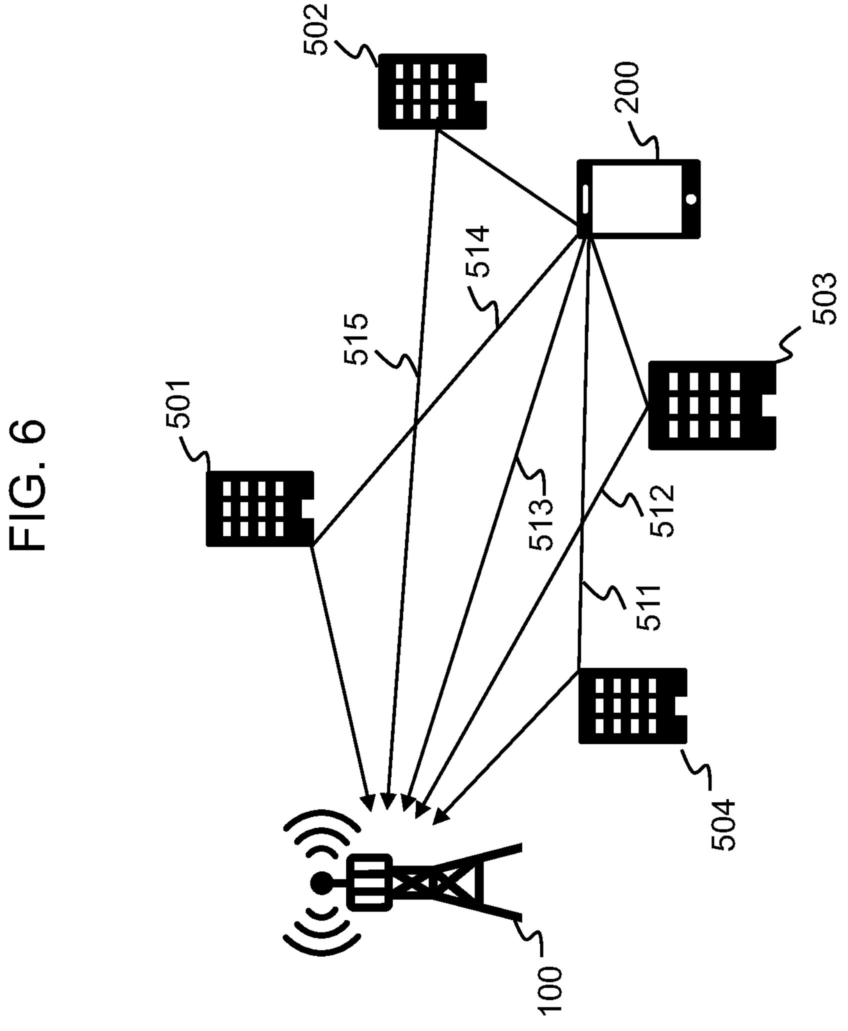
FIG. 6 is a diagram illustrating an uplink transmission from UE to BS in a typical multipath wireless propagation environment in a wireless communication system to which an exemplary embodiment of the present disclosure is applied.

As illustrated in FIG. 6, the UE terminal 200 sends UL-SRS in a multipath propagation environment. Without loss of generality, let us consider UL-SRS as a reference signal. The UL-SRS travels in separate ways denoted by reference numerals 511-515 while reflecting from objects such as buildings 501-504. Accordingly, UL-SRSs that reach the BS device 100 may take different routes, thereby reaching the BS device 100 at different times and different angles. In addition, the UE terminal 200 may move closer to or away from the BS device 100. In such a case, the Doppler effect may be considered.

To perform channel prediction for a time-varying wireless channel in the multipath propagation environment, it may be useful to resolve the received superposed signal into constituent multipath components at first. Following a multipath resolution, the amplitude and phase of each multipath component may be computed. Such a computation may be performed during channel estimation events, based on the received known reference signals. Amplitude and phase values corresponding to each multipath component obtained at two or more channel estimation events of the past may be used in an extrapolation operation to obtain the amplitude and phase values corresponding to each multipath component at a time instant where no channel estimation is performed.

Efficient separation of the multipath components may be crucial for accurate channel prediction. For instance, the multipath components can be separated based on their angle profile or delay profile.

Figure 7:
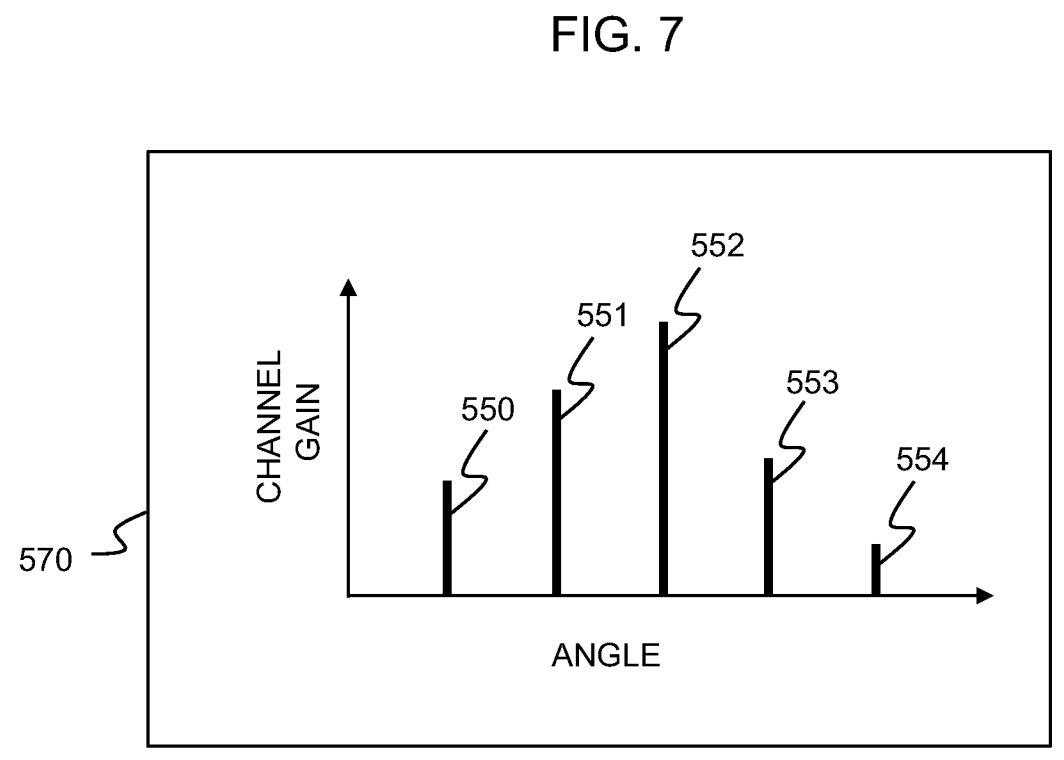

With reference to FIG. 7, the separation of multipath components based on angle is explained. In some examples, we may refer to the angle domain as beamspace domain. Five multipath components represented by 550, 551, 552, 553, and 554 have different angles from each other. Thus, their channel gains can be obtained separately in the angle domain. In a similar fashion, the phase of each of the five multipath components may also be obtained separately.

Figure 8:
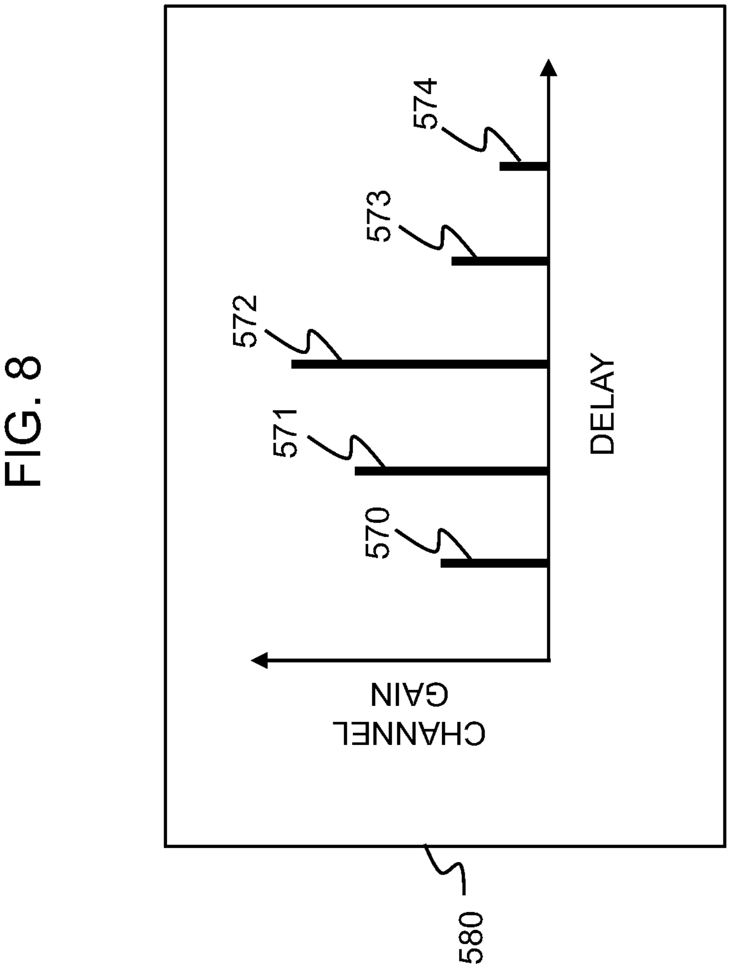
FIG. 8 is a graph illustrating an example of channel gains at different delays of each multipath component for explaining a multipath resolution according to an exemplary embodiment of the present disclosure.

Furthermore, with reference to FIG. 8, the separation of multipath components based on delay is explained. Five multipath components represented by 570, 571, 572, 573, and 574 have different delays from each other. Thus, their channel gains can be obtained separately in the delay domain. In a similar fashion, the phase of each of the five multipath components may also be obtained separately.

According to an embodiment of the present disclosure, it may be possible to separate the multipath components based on their Doppler frequency. Such multipath separation in Doppler domain is explained using the example in FIG. 9. Five multipath components represented by 650, 651, 652, 653, and 654 have different Doppler frequencies from each other. Thus, their channel gains can be obtained separately in the Doppler domain. In a similar fashion, the phase of each of the five multipath components may also be obtained separately.

2. Exemplary Embodiments

Hereafter, an implementation of the above-mentioned prediction method will be described in detail.

As illustrated in FIG. 10, the BS device 100 has an array antenna composed of M antennas ANT.(1)-ANT.(M), where M is an integer greater than one. The antennas ANT.(1)-ANT.(M) are connected to wireless transceivers TR(1)-TR(M), respectively. Each wireless transceiver includes a RF (Radio Frequency) front end 101, a fast Fourier transform (FFT) section 102, and an inverse FFT (IFFT) section 103. The RF front end 101 inputs a RF received signal from a corresponding antenna and outputs a sequence of received data to the FFT section 102. The RF front end 101 inputs a sequence of transmission data from the IFFT section 103 and outputs a RF transmission signal to the corresponding antenna. The FFT section 102 decomposes the sequence of received data to frequency components. The IFFT section 103 composes a sequence of transmission data from frequency components.

The BS device 100 further includes a channel estimator 104, a channel predictor 105 and a precoder 106. The channel estimator 104 inputs frequency components of a UL-SRS from the FFT section 102 of each radio transceiver and outputs channel estimation signals to the channel predictor 105. The channel predictor 105 predicts channel responses at time instants where no channel estimation is performed from two or more past channel responses as described before (see e.g. FIG. 5). The channel predictor 105 outputs the predicted channel responses to the precoder 106.

The BS device 100 further includes a scheduler 107 and a plurality of data processing sections, each of which implements functions of a data generator 108, a forward error correction (FEC) section 109, a modulator 110 and a resource mapper 111. The scheduler 107 decides which users are scheduled for DL transmission in a given time slot. The data generator 108 generates transmission data, which is subjected to FEC at the FEC section 109. The modulator 110 modulates the output of the FEC section 109 to output modulated transmission data to the resource mapper 111. The resource mapper 111 performs resource-mapping of transmission data to output frequency components to the IFFT 103 of each transceiver through the precoder 106. The precoder 106 performs precoding according to the predicted channel responses received from the channel predictor 105. As described before, the channel prediction can be done for future time slots and the predicted channel responses are stored in a memory. Or the channel prediction can be done in real time in each time slot.

In FIG. 10, the functions as denoted by reference numerals 104-111 may be implemented by a processor or a central processing unit (CPU) running programs stored in a program memory. The programs includes a channel prediction program which can implement the function of the channel predictor 105.

Figure 11:
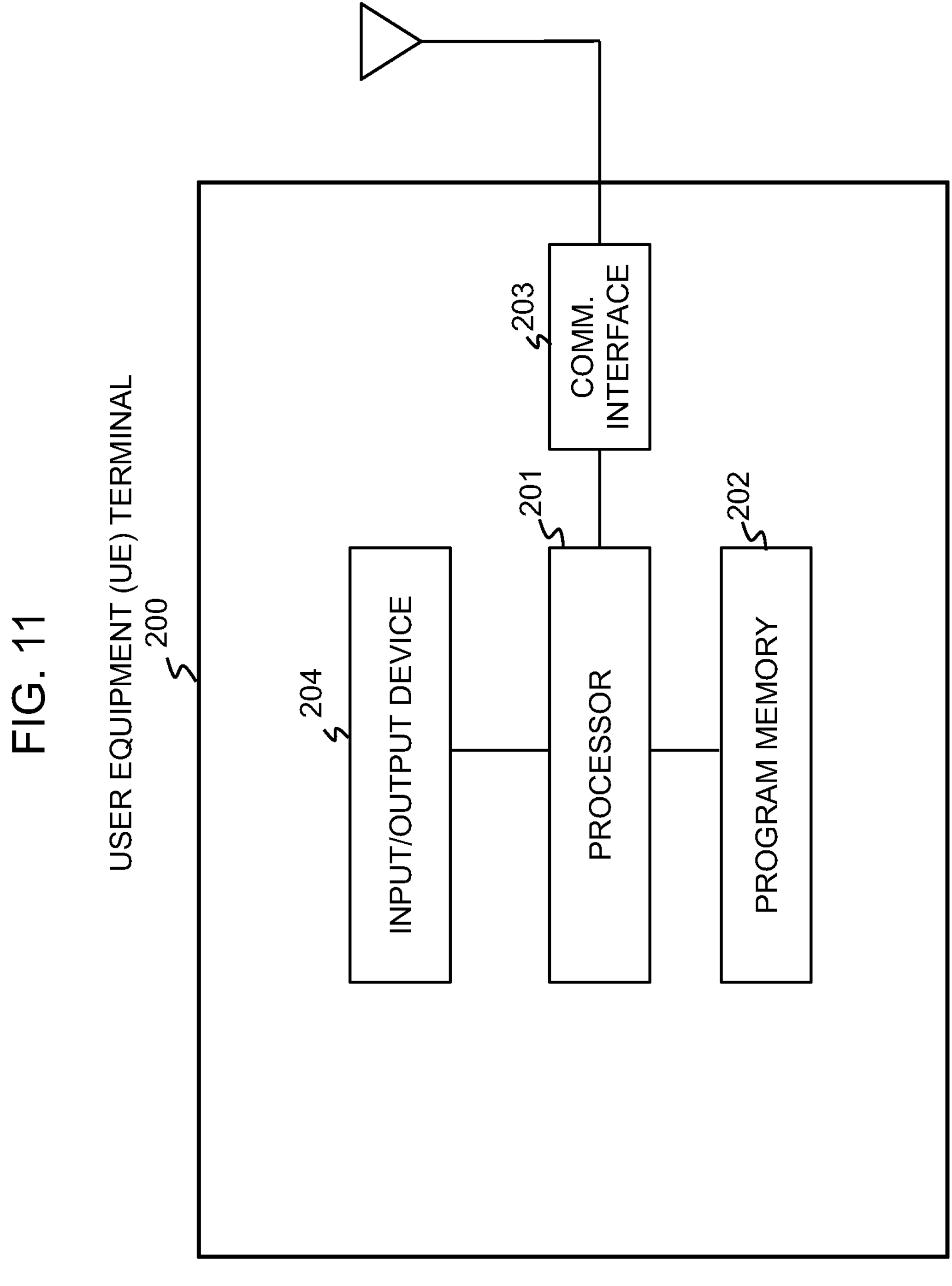
FIG. 11 is a schematic diagram illustrating a functional configuration of a UE terminal according to an exemplary embodiment of the present disclosure.

As illustrated in FIG. 11, the UE terminal 200 includes a processor 201, a program memory 202, a communication interface 203 and an input/output device 204. The processor 201 runs programs stored in the program memory 202 to control UE operations including UL-SRS transmission. The UL-SRS transmission is performed in response to the signaling from the BS device 100. When the UE terminal 200 is located within the radio coverage of a network device such as the BS device 100, the communication interface 203 can connect to the network device by a radio channel.

Figure 12:
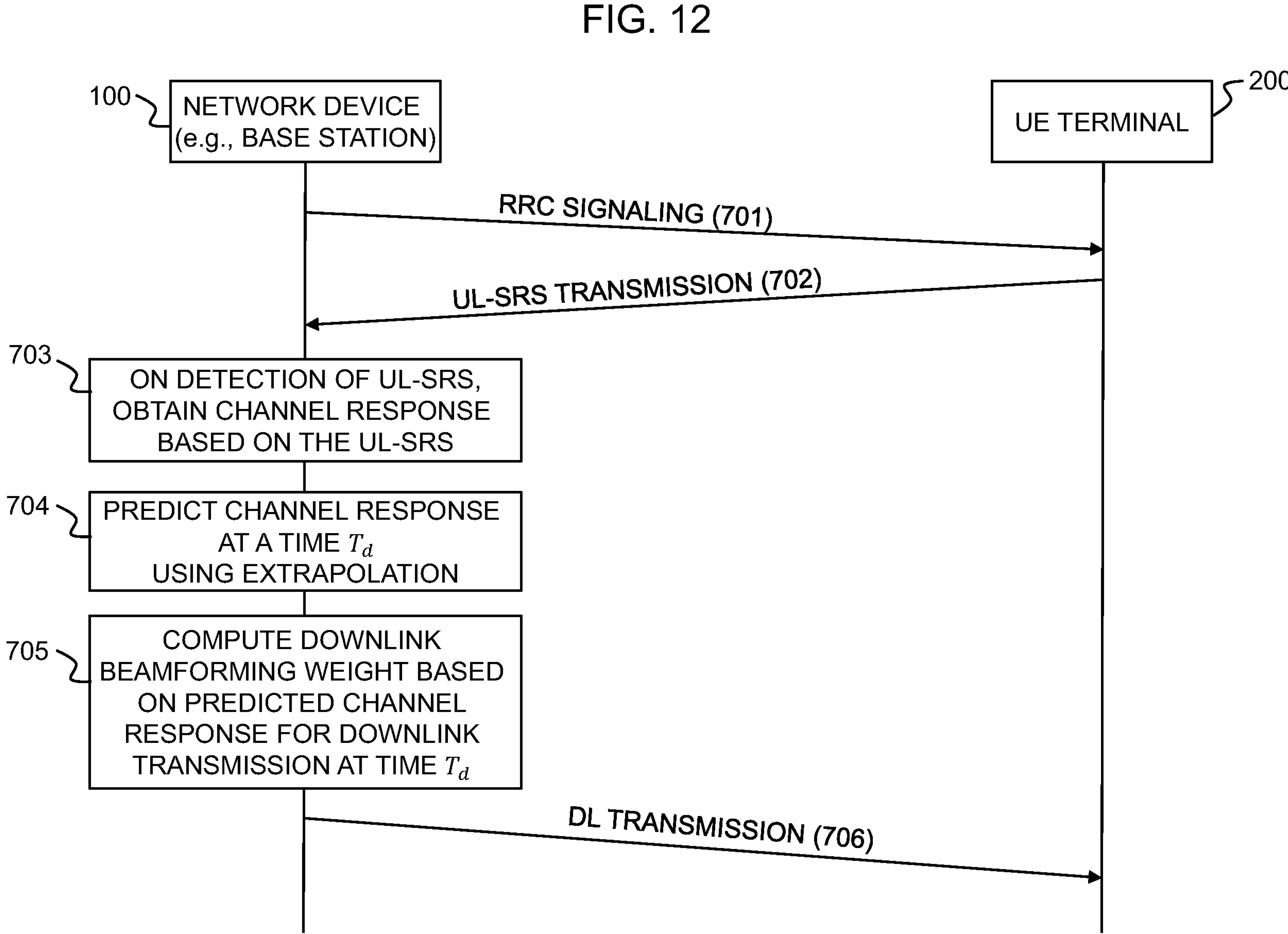
FIG. 12 is a sequence diagram illustrating a series of frame transmission and operations of a wireless communication system according to an exemplary embodiment of the present disclosure.

With reference to FIG. 12, an exemplary frame sequence diagram is shown between a network device (for e.g., the BS device 100) and the UE terminal 200. In one particular example, the BS device 100 may send a radio resource control (RRC) signal to the UE terminal 200 as indicated by 701. The UE terminal 200 may send an uplink sounding reference signal (UL-SRS) to the BS device 100 as indicated by 702. On detection of the UL-SRS, the BS device 100 may obtain the channel response (for example, channel impulse response, channel frequency response, or some other information related to the channel condition) between the BS device 100 and the UE terminal 200 based on the UL-SRS as indicated by 703. Based on one or more channel response obtained from the UL-SRS, the channel response at a time instant Td where no channel estimation is performed may be predicted using an extrapolation operation as described in the step 704. Furthermore, based on the predicted channel response, a downlink beamforming weight for downlink transmission at the time instant Td may be computed as shown in the step 705. Finally, a downlink signal may be sent from the BS device 100 to the UE terminal 200 as indicated by 706 by employing the downlink beamforming weight.

Hereafter, several prediction methods are described. In these methods, it is assumed for simplicity that the BS device 100 is equipped with two antennas ANT.1 and ANT.2 where the uplink reference signal is received from the UE terminal 200. Without loss of generality, let us consider SRS as the reference signal.

2.1) Prediction in Antenna-Subcarrier Domain

Assuming a multicarrier communication system, like orthogonal frequency division multiplexing where a high-rate broadband channel is divided into a plurality of low-rate subchannels (or, subcarriers). Then the BS device 100 may be able to compute frequency response of the channel from the received SRS at each of the two antennas ANT.1 and ANT.2.

More specifically, the amplitude and phase of the channel corresponding to each subcarrier may be computed at each of the two antennas ANT.1 and ANT.2 in a method of channel estimation. By collecting the amplitude and phase corresponding to each subcarrier and each antenna at two or more time instants, it may be possible to predict the value of amplitude and phase corresponding to each subcarrier and each antenna at a time instant where no channel estimation is performed. More specifically, a method, including but not limited to, linear extrapolation, non-linear extrapolation, curve fitting, linear regression, non-linear regression may be employed for the prediction operation. The predicted value of amplitude and phase may be used for the calculation of downlink beamforming weight. This will be described referring to FIG. 31 and FIG. 32.

2.2) Prediction in Antenna-Delay Domain

In the multipath propagation environment, the multipath components may be separated based on the differences in their delays as illustrated in FIG. 8, using the multipaths 570 to 574 with different delays. An example is described by referring to FIGS. 13 and 14.

Figure 14:
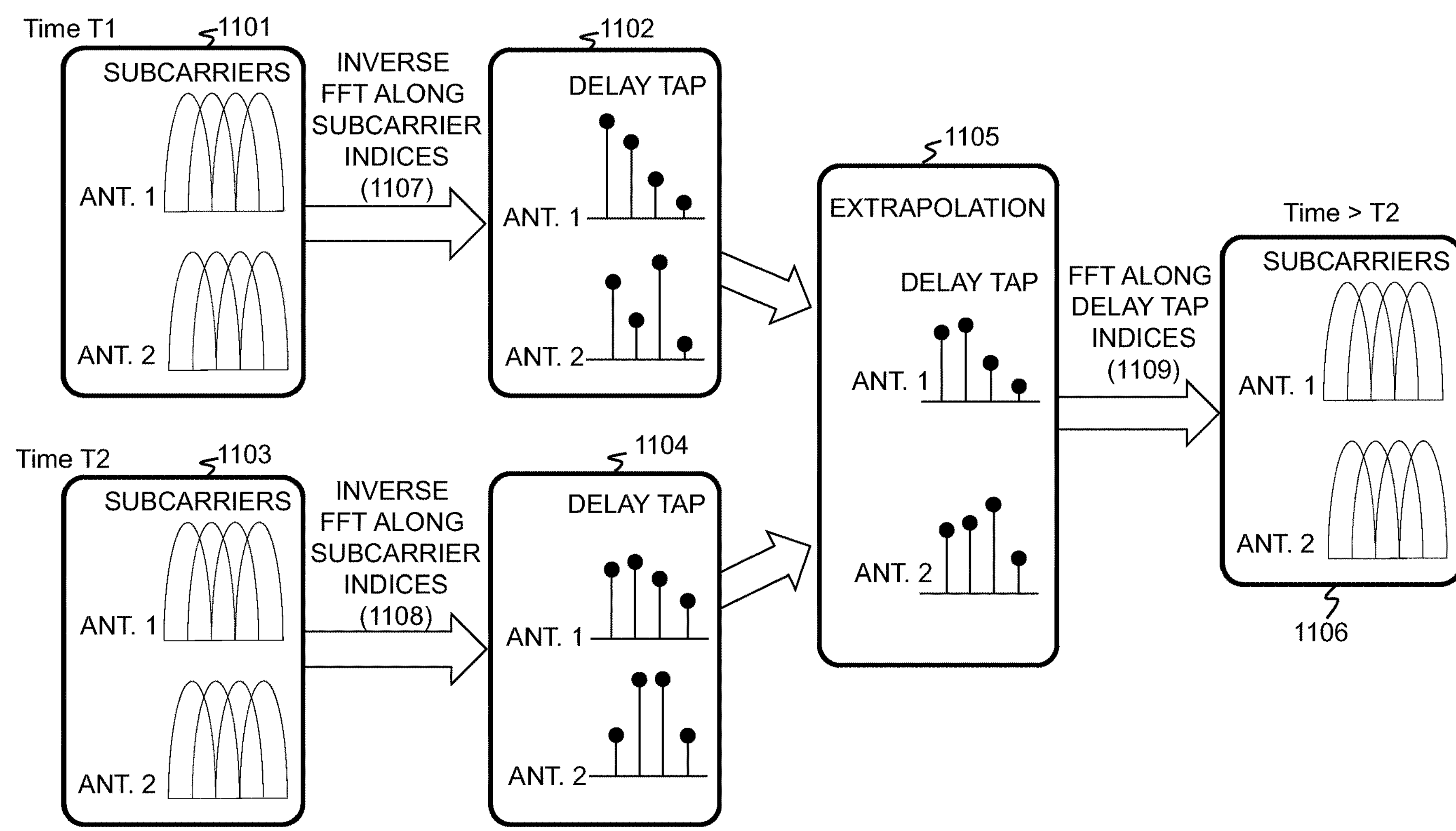
FIG. 14 is a schematic diagram illustrating operations for channel prediction shown in FIG. 13.

Referring to FIGS. 13 and 14, the BS device 100 may be able to compute frequency response of the channel from the received SRS at each of the two antennas ANT.1 and ANT.2. More specifically, the amplitude and phase of the channel corresponding to each subcarrier may be computed at each of the two antennas ANT.1 and ANT.2 in a method of channel estimation at a time instant denoted by T1, as shown in step 1001 of FIG. 13 (also refer to 1101 of FIG. 14). Alternatively, such a value may be represented as a complex number corresponding to each subcarrier and each antenna for a channel between the BS device 100 and the UE terminal 200 at the time instant T1.

It may be possible to perform a transformation operation on these values to convert them to delay domain. An inverse discrete Fourier transform (IDFT) may be one example of such a transformation, although there can be other methods of doing a similar operation. The IDFT operation may be implemented using an inverse fast Fourier transform (IFFT) algorithm in some embodiments. For example, the channel impulse responses corresponding to all subcarriers at each antenna can be subjected to IFFT where the IFFT summation is performed over the subcarrier indices, as shown in step 1002 of FIG. 13 (also refer to 1107 of FIG. 14). Such an operation may generate the delay taps of the multipath components corresponding to each antenna as illustrated in 1102 of FIG. 14.

Thus, the multipath components can be resolved by their individual delays in reaching the BS device 100 after transmission from the given UE terminal. Doing a similar series of steps at time instant T2 as shown using steps 1011 to 1013 of FIG. 13 can generate the delay taps of the multipath components corresponding to each antenna as illustrated in 1104 of FIG. 14.

Thus, outputs from step 1003 and step 1013 of FIG. 13 are fed as input to an extrapolation section, to obtain the magnitude and phase at delay tap of the multipath components corresponding to each antenna at time after T2, as described in step 1020 of FIG. 13 (also illustrated in 1105 of FIG. 14).

The extrapolated delay taps thus obtained are then subjected to a transformation operation to convert back to subcarrier domain. An exemplary transformation is described using step 1021 of FIG. 13 and 1109 of FIG. 14, wherein a discrete Fourier transform (DFT) is performed by summing over the delay tap indices. The DFT operation may be implemented by an FFT algorithm in some embodiments.

As a result, the predicted channel response can be obtained for a time instant after T2, corresponding to each subcarrier and each antenna as described in step 1022 of FIG. 13 and 1106 of FIG. 14.

2.3) Prediction in Delay-Beamspace Domain

In the multipath propagation environment, the multipath components may be separated based on the differences in at least one of their delays and angles. Specifically, separating the multipaths based on angles was illustrated using the multipaths 550 to 554 with different angles in FIG. 7. An example is described by referring to FIGS. 15 and 16.

Figure 16:
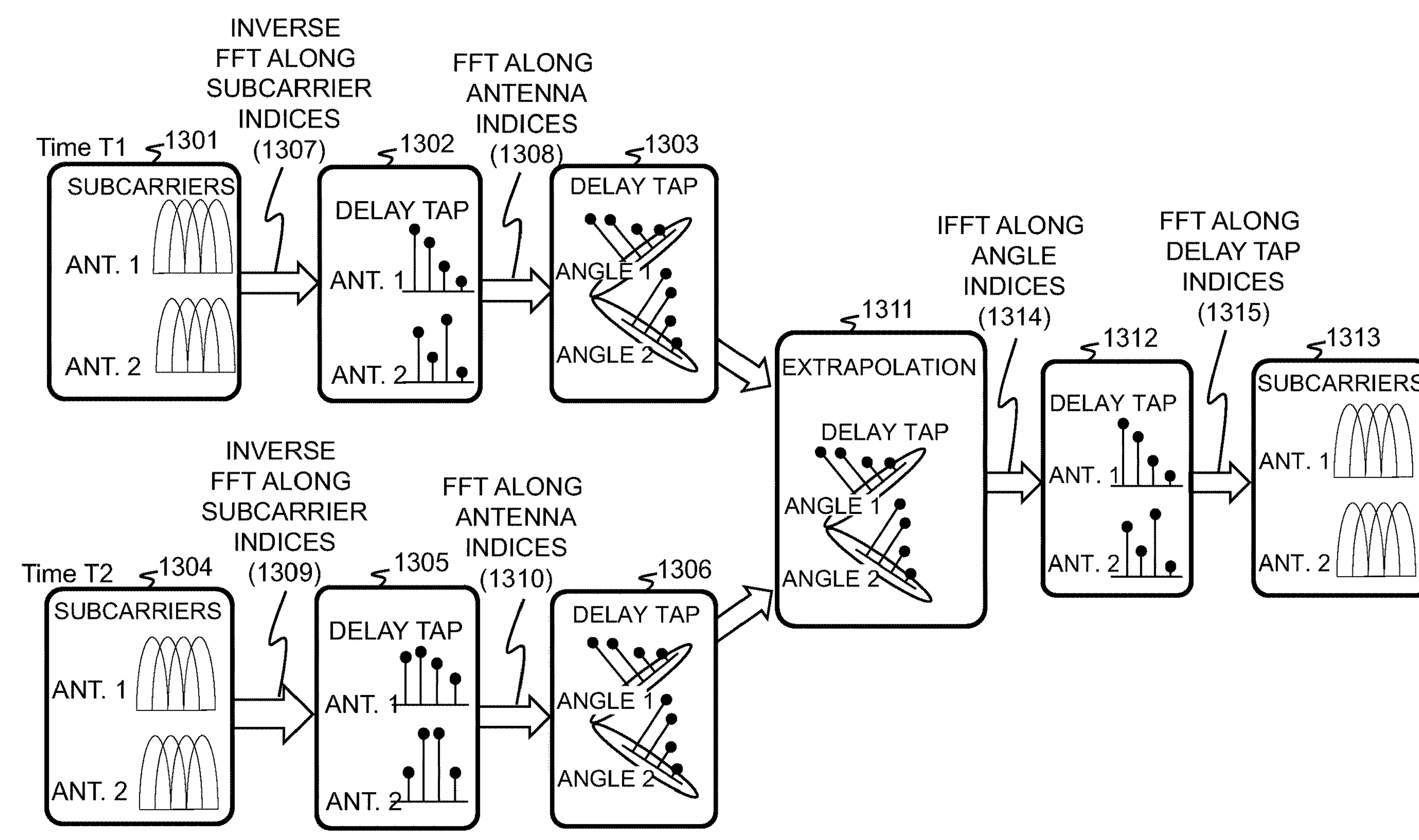
FIG. 16 is a schematic diagram illustrating operations for channel prediction shown in FIG. 15.

Referring to FIGS. 15 and 16, the BS device 100 may be able to compute frequency response of the channel from the received SRS at each of the two antennas ANT.1 and ANT.2. More specifically, the amplitude and phase of the channel corresponding to each subcarrier may be computed at each of the two antennas ANT.1 and ANT.2 in a method of channel estimation at a time instant denoted by T1, as shown in step 1201 of FIG. 15 (also refer to 1301 of FIG. 16). Alternatively, such a value may be represented as a complex number corresponding to each subcarrier and each antenna for a channel between the BS device 100 and the UE terminal 200 at the time instant T1.

It may be possible to perform a transformation operation on these values to convert them to delay domain. An IDFT may be one example of such a transformation, although there can be other methods of doing a similar operation. The IDFT operation may be implemented using an IFFT algorithm in some embodiments. For example, the channel impulse responses corresponding to all subcarriers at each antenna can be subjected to IFFT where the IFFT summation is performed over the subcarrier indices, as shown in step 1202 of FIG. 15 (also refer to 1307 of FIG. 16). Such an operation may generate the delay taps of the multipath components corresponding to each antenna as illustrated in 1302 of FIG. 16.

Thus, the multipath components can be resolved by their individual delays in reaching the BS device 100 after transmission from the given UE terminal. Furthermore, another transformation may be performed to convert from antenna index domain to beamspace domain, or angle domain. A DFT may be one example of such a transformation, although there can be other methods of doing a similar operation. The DFT operation may be implemented using an FFT algorithm in some embodiments. For example, the channel impulse responses corresponding to all antennas can be subjected to FFT where the FFT summation is performed over the antenna indices, as shown in step 1204 of FIG. 15 (also refer to 1308 of FIG. 16). Such an operation may generate the delay taps of the multipath components corresponding to each angle as illustrated in 1303 of FIG. 16.

Thus, the multipath components can be resolved by their individual angle of arrivals at the BS device 100. Doing a similar series of steps at time instant T2 as shown using steps 1207 to 1211 of FIG. 15 can generate the delay taps of the multipath components corresponding to each angle of arrivals, as illustrated using 1304, 1305 and 1306 of FIG. 16. Thus, outputs from step 1205 and step 1211 of FIG. 15 are fed as input to an extrapolation operator, to obtain the magnitude and phase at delay tap of the multipath components corresponding to each angle of arrivals at time after T2, as described in step 1212 of FIG. 15 (also illustrated in 1311 of FIG. 16).

The extrapolated values at each delay tap at all angles of arrival (or, equivalently beams) thus obtained are then subjected to a transformation operation to convert back to antenna domain. An exemplary transformation is described using step 1213 of FIG. 15 and step 1314 of FIG. 16, wherein an IDFT operation is performed by summing along the number of beams or angles of arrivals. The IDFT operation may be implemented by an IFFT algorithm in some embodiments. As a result, the predicted channel response can be obtained for a time instant after T2, corresponding to each delay tap and each antenna index as described in step 1214 of FIG. 15, and 1312 of FIG. 16.

Furthermore, the output from step 1214 of FIG. 15 can be subjected to a transformation operation to convert back to antenna-subcarrier domain. An exemplary transformation is described using step 1215 of FIG. 15 and step 1315 of FIG. 16, wherein a DFT operation is performed by summing along the delay tap indices. The IDFT operation may be implemented by an IFFT algorithm in some embodiments. As a result, the predicted channel response can be obtained for a time instant after T2, corresponding to each subcarrier and each antenna index as described in step 1216 of FIG. 15, and 1313 of FIG. 16.

2.4) Prediction in Delay-Doppler-Beamspace Domain

Figure 9:
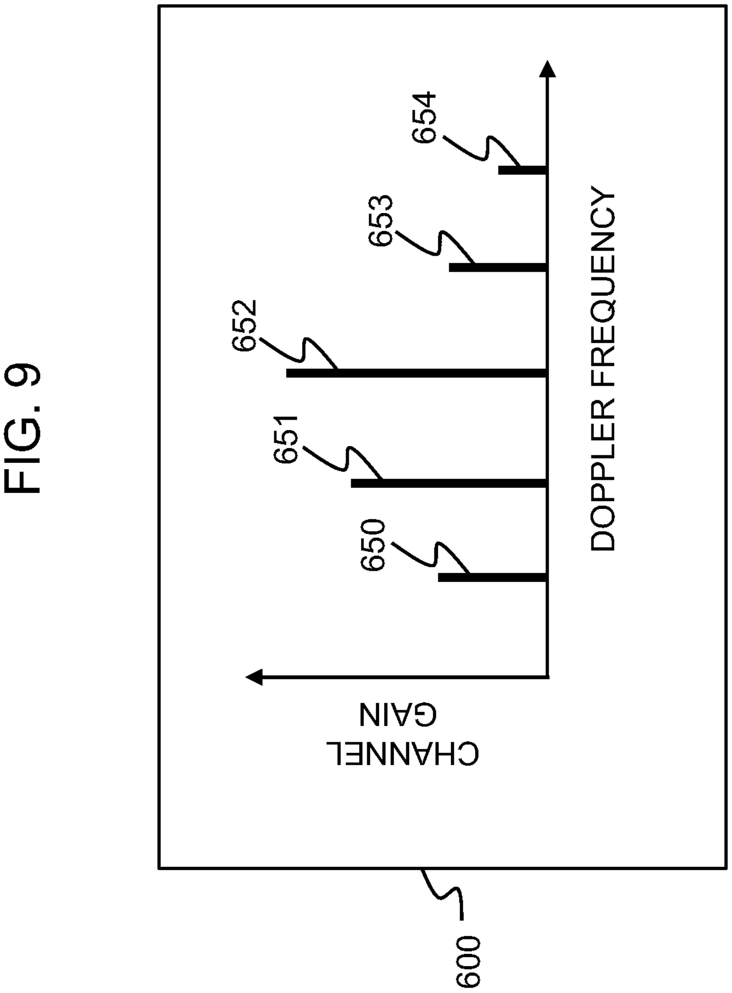
FIG. 9 is a graph illustrating an example of channel gains at different Doppler frequencies of each multipath component for explaining a multipath resolution according to an exemplary embodiment of the present disclosure.

In the multipath propagation environment, the multipath components may be separated based on the differences in at least one of their delays, angles, and Doppler frequencies. Specifically, separating the multipaths based on angles is earlier illustrated using the multipaths 550 to 554 with different angles in FIG. 7. Furthermore, separating the multipaths based on delays is earlier illustrated using the multipaths 570 to 574 with different delays in FIG. 8. With reference to FIG. 9, separating the multipaths based on Doppler frequencies is illustrated using the multipaths 650 to 654 with different Doppler frequencies. Hereafter, an example is described for channel prediction in delay, Doppler, and beamspace domain with reference to FIG. 17-21 as well as FIGS. 15 and 16.

Figure 18:
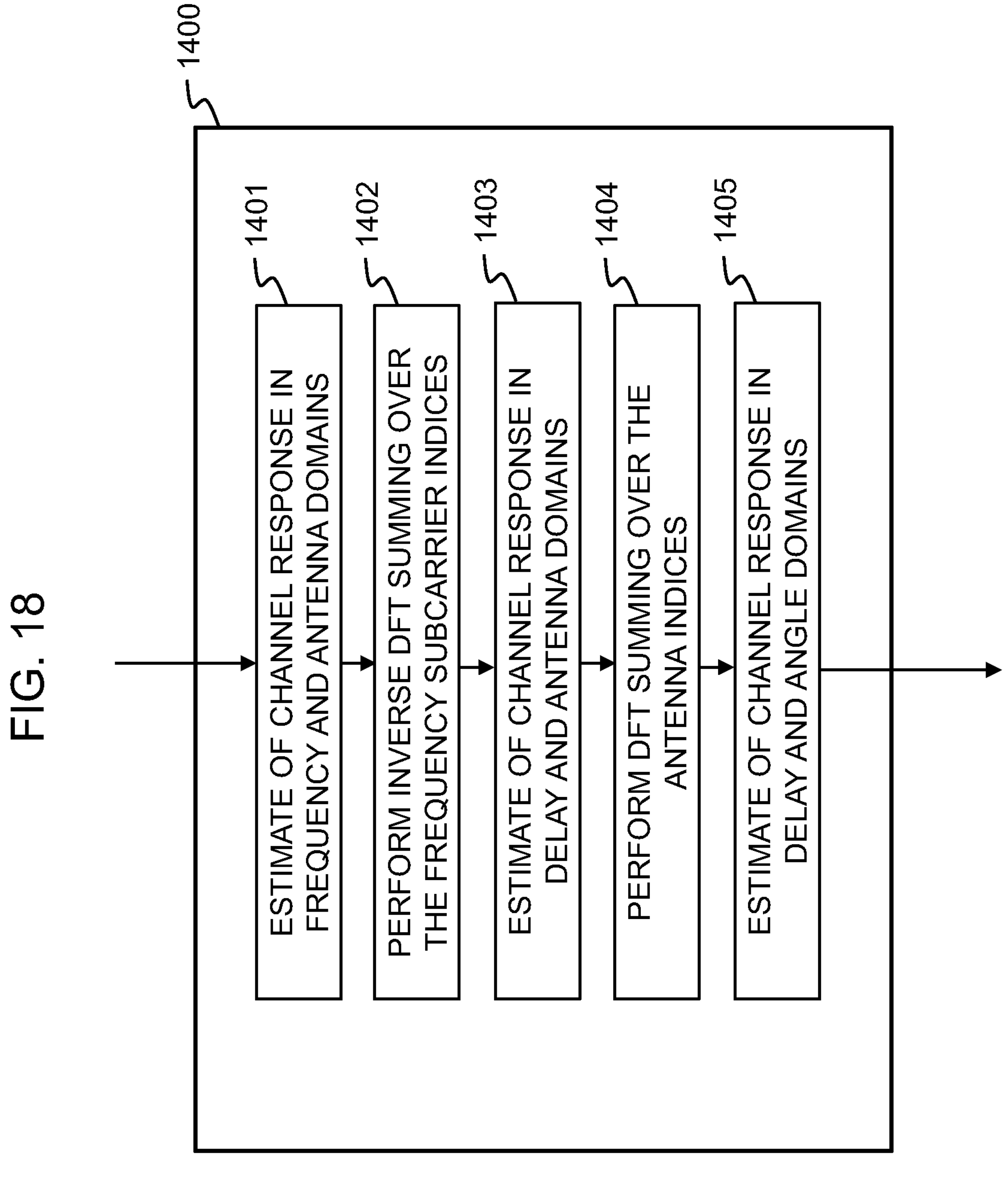
FIG. 18 is a flowchart illustrating detailed operations of a specific procedure in channel prediction shown in FIG. 17.
Figure 19:
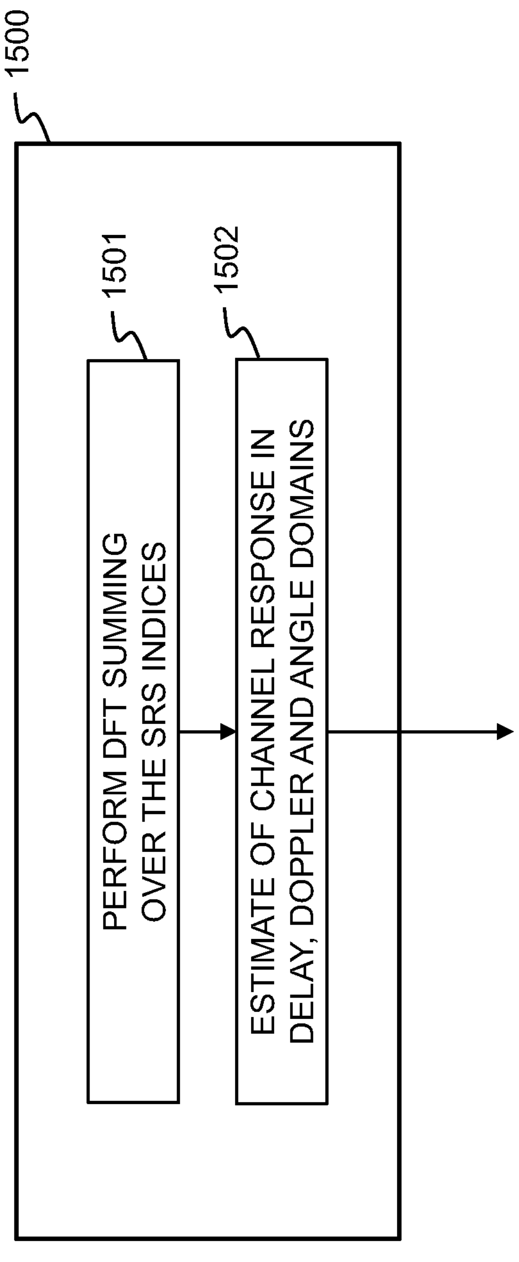
FIG. 19 is a flowchart illustrating detailed operations of a specific procedure in channel prediction shown in FIG. 17.
Figure 20:
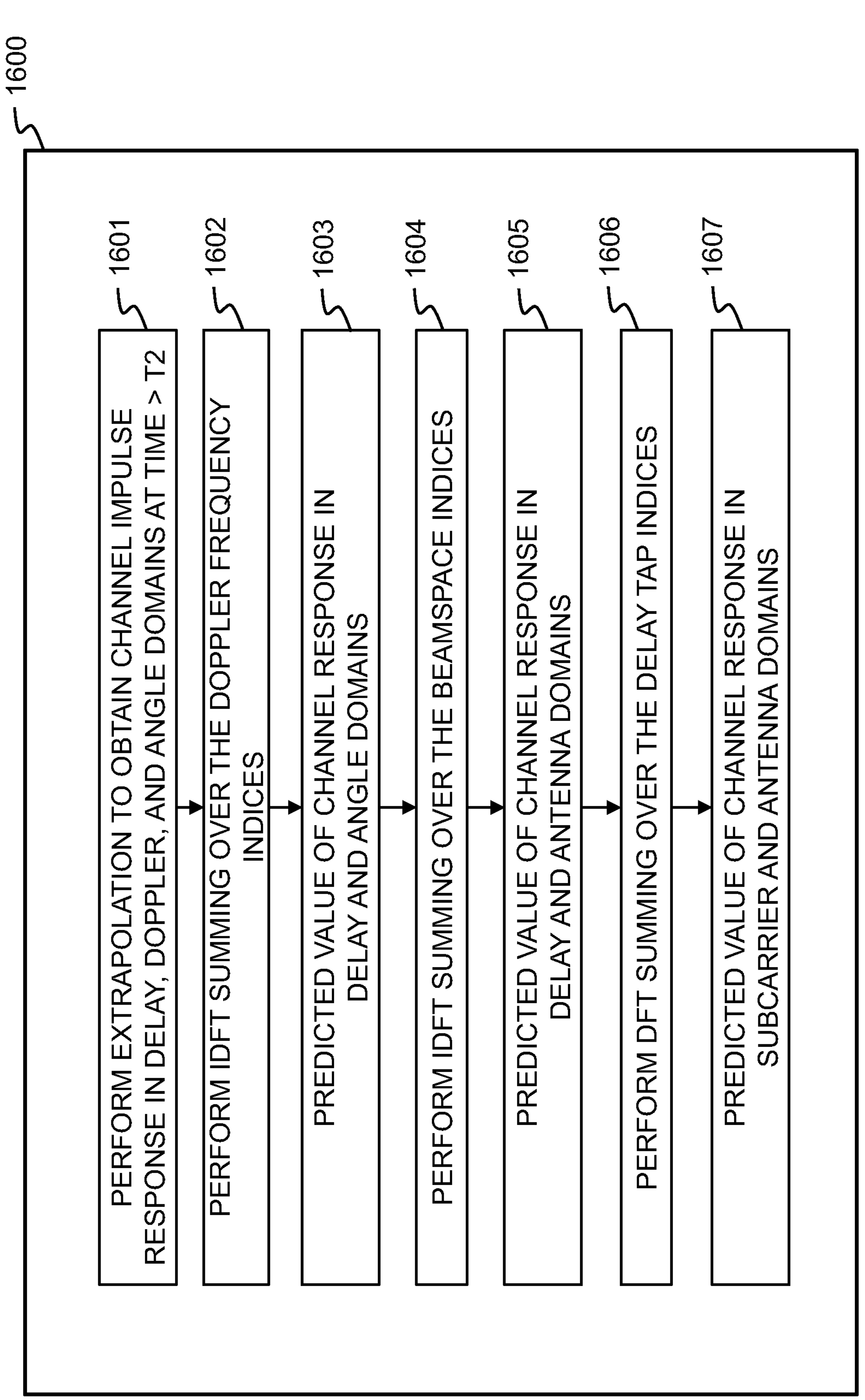
FIG. 20 is a flowchart illustrating detailed operations of a specific procedure in channel prediction shown in FIG. 17.
Figure 21:
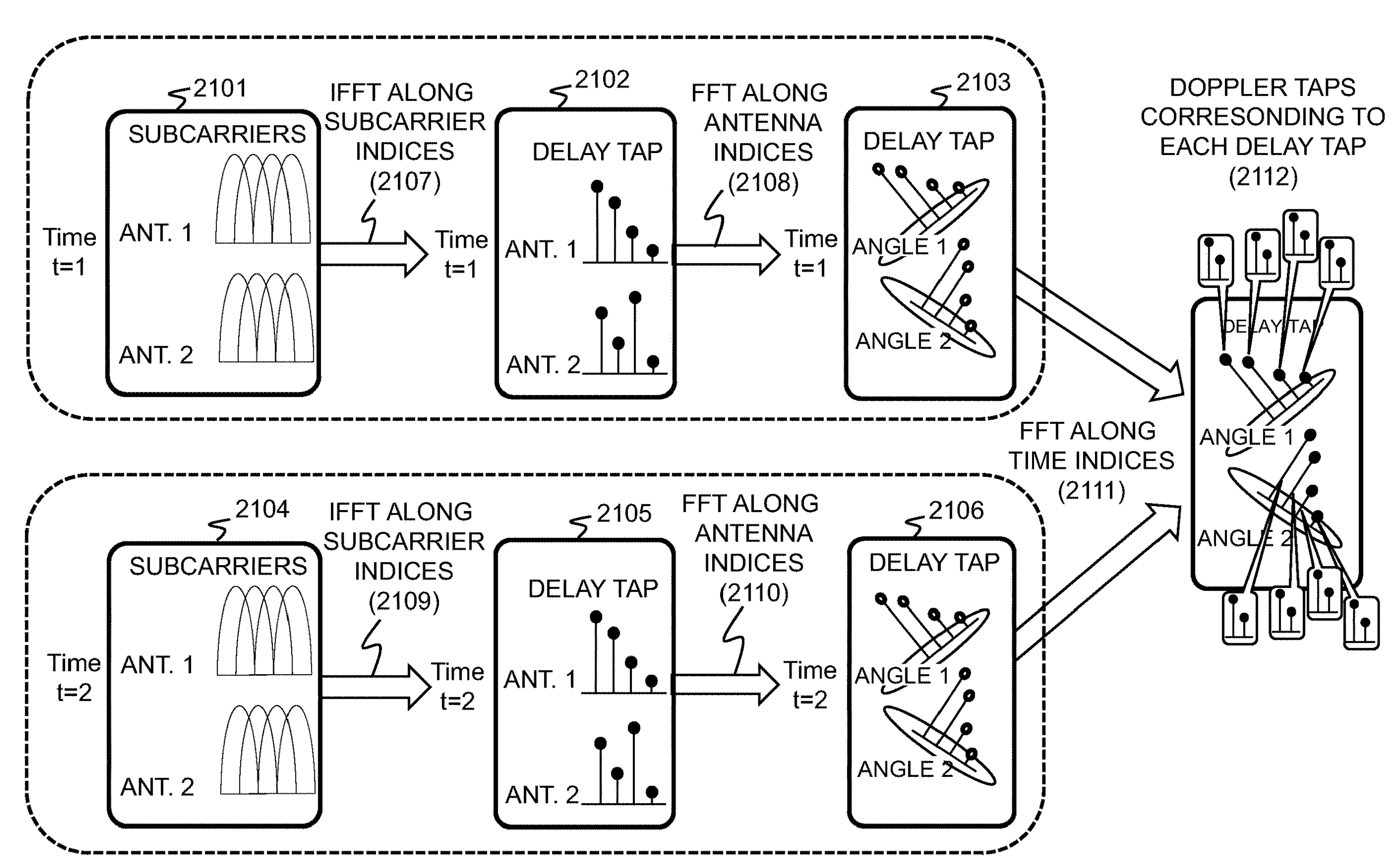
FIG. 21 is a schematic diagram illustrating operations for multipath component resolution in delay-Doppler-beamspace domain, according to an exemplary embodiment of the present disclosure.

As illustrated in FIG. 17, the channel prediction in delay, Doppler and beamspace domains may be performed by executing a procedure 1400 shown in FIG. 18, a procedure 1500 shown in FIG. 19 and a procedure 1600 shown in FIG. 20. the procedure 1400 is repeated at time instants T1, T2, T3 and T4 as labeled with 1400(1), 1400(2), 1400(3) and 1400(4). The procedure 1500 is repeated when inputting the outputs of the procedure (1) and 1400(2) and when inputting the outputs of the procedure (3) and 1400(4).

As illustrated in FIG. 18, the procedure 1400 includes the steps 1401-1405 corresponding respectively to the steps 1201-1205 as shown in FIG. 15. As is the case with FIGS. 15 and 16, FIG. 18 corresponds to FIG. 21. More specifically, the BS device 100 may be able to compute frequency response of the channel from the received SRS at each of the two antennas ANT.1 and ANT.2. More specifically, the amplitude and phase of the channel corresponding to each subcarrier may be computed at each of the two antennas ANT.1 and ANT.2 in a method of channel estimation at a time instant denoted by T1, as shown in step 1401 of FIG. 18 (also refer to 2101 of FIG. 21). Alternatively, such a value may be represented as a complex number corresponding to each subcarrier and each antenna for a channel between the BS device 100 and the UE terminal 200 at the time instant T1. It may be possible to perform a transformation operation on these values to convert them to delay domain. An IDFT may be one example of such a transformation, although there can be other methods of doing a similar operation. The IDFT operation may be implemented using an IFFT algorithm in some embodiments. For example, the channel impulse responses corresponding to all subcarriers at each antenna can be subjected to IFFT where the IFFT summation is performed over the subcarrier indices, as shown in step 1402 of FIG. 18 (also refer to 2107 of FIG. 21). Such an operation may generate the delay taps of the multipath components corresponding to each antenna as illustrated in 2102 of FIG. 21.

Thus, the multipath components can be resolved by their individual delays in reaching the BS after transmission from the given UE. Furthermore, another transformation may be performed to convert from antenna index domain to beam-space domain, or angle domain. A DFT may be one example of such a transformation, although there can be other methods of doing a similar operation. The DFT operation may be implemented using an FFT algorithm in some embodiments. For example, the channel impulse responses corresponding to all antennas can be subjected to FFT where the FFT summation is performed over the antenna indices, as shown in step 1404 of FIG. 18 (also refer to 2108 of FIG. 21). Such an operation may generate the delay taps of the multipath components corresponding to each angle as illustrated in 2103 of FIG. 21. Thus, the multipath components can be resolved by their individual angle of arrivals at the BS device 100.

As illustrated in FIG. 19, in the procedure 1500, a first step 1501 constitutes of performing a transformation operation to convert a collection of time-domain samples into Doppler domain. A DFT may be one example of such a transformation, although there can be other methods of doing a similar operation. The DFT operation may be implemented using an FFT algorithm in some embodiments. For example, the channel impulse responses corresponding to multiple SRS transmission time-slots can be subjected to FFT where the FFT summation is performed over the SRS time-slot indices, as shown in step 1501 of FIG. 19. Such an operation may generate the amplitude and phase of the channel corresponding to each Doppler frequency, for each delay tap at each beam angle of the multipath components as illustrated in 2112 of FIG. 21. Thus, the multipath components can be resolved by their individual Doppler frequencies as illustrated in 1502 of FIG. 19. Note that the example shown in FIG. 17 assumes the Doppler FFT size to be 2.

Back to FIG. 17, the procedure 1400 may be performed at time instants T3 and T4 as well, wherein the outputs from the steps 1400(3) and 1400(4) corresponding to time instants T3 and T4 respectively can be fed to the procedure 1500(2). The output from the procedure 1500 corresponding to the pair T3 and T4 may then be fed into the procedure 1600. Thus, the procedure 1600 received two inputs in the example shown in FIG. 17.

As illustrated in FIG. 20, the procedure 1600 includes steps 1601-1607. As described in the step 1601, extrapolation can be performed on the amplitude or phase or both of the multipath components corresponding to each Doppler frequency, each delay tap, and each beam angle. Thus, the extrapolated value of amplitude or phase or both may be obtained at a time instant after T2.

Subsequently, the extrapolated values at each Doppler frequencies, at each delay tap, and at all angles of arrival (or equivalently, beam angles) thus obtained can then be subjected to a transformation operation to convert back to delay and angle domains. An exemplary transformation is described using the step 1602 FIG., wherein an IDFT operation is performed by summing along the number of discrete Doppler frequency components. The IDFT operation may be implemented by an IFFT algorithm in some embodiments. As a result, the predicted channel response can be obtained for a time instant after T2, corresponding to each delay tap and each beam angle, as described in the step 1603.

Furthermore, the output from the step 1603 can be subjected to a transformation operation to convert back to antenna-delay domain. An exemplary transformation is described using the step 1604 FIG., wherein an IDFT operation is performed by summing along the beam indices. The IDFT operation may be implemented by an IFFT algorithm in some embodiments. As a result, the predicted channel response can be obtained for a time instant after T2, corresponding to each delay tap and each antenna index as described in the step 1605.

Furthermore, the output from the step 1605 can be subjected to a transformation operation to convert back to antenna-subcarrier domain. An exemplary transformation is described using the step 1606 FIG., wherein a DFT operation is performed by summing along the delay tap indices. The DFT operation may be implemented by an FFT algorithm in some embodiments. As a result, the predicted channel response can be obtained for a time instant after T2, corresponding to each subcarrier and each antenna index as described in the step 1607.

2.5) Prediction in Doppler Domain

Referring to FIG. 22, an example of Doppler domain prediction according to an exemplary embodiment of the present disclosure is discussed. In this example, two values of a first channel response, namely, first channel response 1 in time domain (indicated by 2201) and first channel response 2 in time domain (indicated by 2202) are fed as input to a first transformation section (indicated by 2205). The output of the first transformation section (2205) is obtained in Doppler domain as indicated by 2207.

Similarly, another two values of a first channel response, namely, first channel response 3 in time domain (indicated by 2203) and first channel response 4 in time domain (indicated by 2204) are fed as input to a first transformation section (indicated by 2206). The output of the first transformation (2206) is obtained in Doppler domain as indicated by 2208.

Furthermore, the outputs 2207 and 2208 are fed as input to an extrapolation section indicated by 2209. The output from the extrapolation section 2209 is fed as input to a second transformation section (indicated by 2210) such that a second channel response in the time domain is obtained (indicated by 2211). In some variant, the first transformation section and the second transformation section may have an inverse relationship. For example, the first transformation section may be a DFT while the second transformation section may be an IDFT. The DFT may be implemented by an FFT algorithm while the IDFT may be implemented by an IFFT algorithm.

2.6) Prediction in Delay-Doppler Domain

Referring to FIG. 23, an example of delay-Doppler domain prediction according to an exemplary embodiment of the present disclosure is discussed. In this example, a first channel response, namely, first channel response 1 in subcarrier-time domain (indicated by 2301) is fed as input to a first transformation section for subcarrier-to-delay transformation (indicated by 2305).

Similarly, another first channel response, namely, first channel response 2 in subcarrier-time domain (indicated by 2302) is fed as input to a first transformation section for subcarrier-to-delay transformation (indicated by 2306). The outputs from the first transformation sections 2305 and 2306 are first channel response 1 in delay-time domain (indicated by 2309) and first channel response 2 in delay-time domain (indicated by 2310) respectively. The outputs 2309 and 2310 are fed as input to a first transformation section for time to Doppler transformation (indicated by 2313). The first transformation section 2313 gives an output in delay-Doppler domain (as indicated by 2315).

Furthermore, a first channel response 3 in subcarrier-time domain (indicated by 2303) is fed as input to a first transformation section for subcarrier-to-delay transformation (indicated by 2307). Similarly, another first channel response, namely, first channel response 4 in subcarrier-time domain (indicated by 2304) is fed as input to a first transformation section for subcarrier-to-delay transformation (indicated by 2308). The outputs from the first transformation sections 2307 and 2308 are first channel response 3 in delay-time domain (indicated by 2911) and first channel response 4 in delay-time domain (indicated by 2312) respectively. The outputs 2311 and 2312 are fed as input to a first transformation section for time to Doppler transformation (indicated by 2314). The first transformation section 2314 gives an output in delay-Doppler domain (as indicated by 2316).

In the next step, the outputs 2315 and 2316 are fed as input to an extrapolation section (indicated by 2317) whose output is subjected to a second transformation for Doppler to time transformation (indicated by 2318). The output of the second transformation section 2318 is a second channel response in delay-time domain (indicated by 2319) which is subjected to yet another second transformation for delay to subcarrier transformation (indicated by 2220). The second channel response in subcarrier-time domain (indicated by 2321) is obtained as output from the second transformation section 2320. In some variant, the first transformation section and the second transformation section may have an inverse relationship. For example, the first transformation as denoted by 2305, 2306, 2307, 2308 may be an IDFT while the second transformation denoted by 2320 may be a DFT. Furthermore, the first transformation denoted by 2313 and 2314 may be a DFT while the second transformation denoted by 2318 may be an IDFT. The DFT may be implemented by an FFT algorithm while the IDFT may be implemented by an IFFT algorithm.

2.7) Prediction in Doppler-Beamspace Domain

Referring to FIG. 24, an example of Doppler-beamspace domain prediction according to an exemplary embodiment of the present disclosure is discussed. In this example, a first channel response, namely, first channel response 1 in antenna-time domain (indicated by 2401) is fed as input to a first transformation section for antenna-to-beamspace transformation (indicated by 2405).

Similarly, another first channel response, namely, first channel response 2 in antenna-time domain (indicated by 2402) is fed as input to a first transformation section for antenna-to-beamspace transformation (indicated by 2406). The outputs from the first transformation sections 2405 and 2406 are intermediate channel response 1 in beamspace-time domain (indicated by 2409) and intermediate channel response 2 in beamspace-time domain (indicated by 2410) respectively. the outputs 2409 and 2410 are fed as input to a first transformation section for time to Doppler transformation (indicated by 2413). The first transformation section 2413 gives an output in beamspace-Doppler domain (as indicated by 2415).

Furthermore, a first channel response 3 in antenna-time domain (indicated by 2403) is fed as input to a first transformation section for antenna-to-beamspace transformation (indicated by 2407). Similarly, another first channel response, namely, first channel response 4 in antenna-time domain (indicated by 2404) is fed as input to a first transformation section for antenna-to-beamspace transformation (indicated by 2408). The outputs from the first transformation sections 2407 and 2408 are intermediate channel response 3 in beamspace-time domain (indicated by 2411) and intermediate channel response 4 in beamspace-time domain (indicated by 2412) respectively. The outputs 2411 and 2412 are fed as input to a first transformation section for time to Doppler transformation (indicated by 2414). The first transformation section 2414 gives an output in beamspace-Doppler domain (as indicated by 2416).

In the next step, the outputs 2415 and 2416 are fed as input to an extrapolation section (indicated by 2417) whose output is subjected to second transformation for Doppler to time transformation (indicated by 2418). The output of the second transformation section 2418 is a second channel response in beamspace-time domain (indicated by 2419) which is subjected to yet another second transformation for beamspace to antenna transformation (indicated by 2420). The second channel response in antenna-time domain (indicated by 2421) is obtained as output from the second transformation section 2420. In some variant, the first transformation and the second transformation may have an inverse relationship. For example, the first transformation denoted by 2405, 2406, 2407, 2408 may be an IDFT while the second transformation denoted by 2420 may be a DFT. Furthermore, the first transformation denoted by 2413 and 2414 may be a DFT while the second transformation denoted by 2418 may be an IDFT. The DFT may be implemented by an FFT algorithm while the IDFT may be implemented by an IFFT algorithm.

3. Exemplary Embodiments

3.1) First Exemplary Embodiment

With reference to FIG. 25, a first example of the present disclosure will be described in detail. In this example, it is assumed that SRS is transmitted from a UE terminal 200 to the BS device 100 at intervals of 40 milliseconds (ms). The BS device 100 computes estimates of channel response from the received SRS at T=0 ms, 40 ms, 80 ms, and 120 ms. Each of these four channel estimates (indicated by 2501, 2502, 2503, and 2504 respectively) are subjected to an IFFT operation at first (indicated by 2509, 2510, 2511, and 2512 respectively), followed by an FFT operation (indicated by 2517, 2518, 2519, and 2520 respectively). Here the IFFT operations (2509, 2510, 2511, and 2512) are performed by summing along the subcarrier indices, and FFT operations (2517, 2518, 2519, and 2520) are performed by summing along the antenna indices. The outputs from the FFT sections 2517, 2518, 2519, and 2520 are subjected to a four-point FFT (2525) in this example. However the FFT size is a tunable parameter in the present disclosure, and it can be chosen to other values like 2, 4, 8, 16, 32, 64 etc. Note that, when an N-point FFT is used in the FFT section 2525, then N estimates of the channel response may be required.

A similar set of procedures denoted by 2516 and 2524) may be carried out on the channel estimate at T=160 ms (2505). The outputs from FFT sections 2518, 2519, 2520, and 2524 may be subjected to a four-point FFT denoted by 2526 in this example.

Finally, the outputs from FFT sections 2525 and 2526 may be fed as input to an extrapolation section. In this specific example, we show a two-point based extrapolation section denoted by 2527 which uses only two inputs. However, there is no restriction on the number of inputs that can be provided to the extrapolation section. Higher number of inputs may improve the prediction result. For example, a method like linear or non-linear regression, curve fitting or similar techniques may be used for extrapolation denoted by 2527. The output from the extrapolation section 2527 is subjected to an IFFT operation by summing along the indices of Doppler frequency components as shown by 2528. The output from the IFFT section 2528 is processed by another IFFT section denoted by 2529 wherein the summation is done along the indices of beam angle indices. Finally, the output from the IFFT section 2529 is subjected to another FFT operation denoted by 2530 wherein the summation is performed along the delay tap indices. The predicted channel response in antenna-subcarrier domain for a time instant T>160 ms is obtained as shown by 2531.

3.2) Second Exemplary Embodiment

With reference to FIG. 26, a second example of the present disclosure employing N-point FFT operation for Doppler domain transformation is described. As described by referring to FIG. 25, it is shown that there are four inputs to the FFT sections 2525 and 2526. However, with reference to FIG. 26, it is seen that FFT is performed along N time indices for conversion to Doppler domain. Specifically, N blocks marked 2601, 2602, 2603, . . . , 2604 individually perform two stage transformations based on FFT which are shown by e.g. 2107 and 2108 of FIG. 21. The N outputs from the blocks 2601, 2602, 2603, . . . , 2604 are fed as input to an N-point FFT section, which results in Doppler domain transformation. Thus, the block 2605 contains the channel response in delay-Doppler-beamspace domain. For FFT-based DFT implementation, N can take values that are power of 2, like 2, 4, 8, 16, 32 etc.

3.3) Third Exemplary Embodiment

With reference to FIG. 27, a third example of the present disclosure is described. Here, the Doppler domain FFT size is shown as 4. Furthermore, the consecutive Doppler domain FFT sections have only one point difference in their input. This can be thought of as a sliding window implementation of FFT, wherein the FFT window is moved by one point between successive FFT operations. This is explained as follows.

The FFT section denoted by 2725 has 4 inputs coming from the FFT sections 2710, 2712, 2714 and 2716. Furthermore, the FFT section denoted by 2726 has 4 inputs coming from the FFT sections 2712, 2714, 2716 and 2718. Thus it is observed that the consecutive FFT sections 2725 and 2726 have only one dissimilar input. It is further seen in this example that each of the blocks for linear extrapolation of amplitude or phase or both denoted by 2730, 2731, 2732, 2733 takes 2 inputs. The output from block 2730 is the predicted channel response between channel estimates 2705 and 2706. This is because the block 2730 takes the two inputs from the FFT sections 2725 and 2726 respectively. The calculation in the FFT section 2725 requires channel estimates 2701, 2702, 2703, and 2704. Also, the calculation in the FFT section 2726 requires channel estimates 2702, 2703, 2704, and 2705. Hence the output from the block 2730 can be the predicted value after time t=160 ms (indicated by 2705) and before the next channel estimation instant at time t=200 ms.

3.4) Fourth Exemplary Embodiment

With reference to FIG. 28, a fourth example of the present disclosure is described. Here, the Doppler domain FFT size is shown as 4. Furthermore, the consecutive Doppler domain FFT sections have only two point difference in their input. This can be thought of as a sliding window implementation of FFT, wherein the FFT window is moved by two points between successive FFT operations. This is explained as follows. The FFT section 2859 has 4 inputs coming from channel estimates 2801, 2802, 2803 and 2804. Specifically, the channel estimate 2801 goes through an IFFT section (2809) and an FFT section (2810), and then is fed as input to the FFT section 2859. Similarly, channel estimate 2802 goes through 2811 and 2812 before being fed as input to 2859. Similar operations are done to the channel estimates 2803 and 2804 before being fed as input to 2859. Furthermore, the FFT section 2850 has 4 inputs coming from channel estimates 2803, 2804, 2805 and 2806. Specifically, the channel estimate 2803 goes through an IFFT section (2813) and an FFT section (2814), and then is fed as input to the FFT section 2850. Similarly, the channel estimate 2804 goes through 2815 and 2816 before being fed as input to 2850. Similar operations are done to the channel estimates 2805 and 2806 before being fed as input to 2850. Thus, it is observed that the consecutive FFT sections 2859 and 2850 have only two dissimilar inputs. In other variants, the FFT window may be moved by more than two points between successive FFT operations. Based on the similar reasoning as discussed earlier, the output from the block 2852 includes a predicted value of channel response (amplitude, phase or both) between time t=200 ms and t=280 ms. Similarly, the output from the block 2853 includes a predicted value of channel response (amplitude, phase or both) between time t=280 ms and t=360 ms. Such an implementation may have reduced complexity than another implementation described in FIG. 27. This may be possible due to fewer number of FFT operations.

3.5) Fifth Exemplary Embodiment

With reference to FIG. 29, a fifth example of the present disclosure is described. Unlike the previous examples, here the number of data points used by the extrapolation sections 2910 and 2911) is more than 2. For instance, in this example, the case using 4 inputs to the extrapolation section is shown. Thus, the extrapolation section 2910 has four inputs from FFT sections 2905, 2906, 2907, and 2908. By using higher number of data points in the extrapolation operation, it may be possible to improve the accuracy of prediction.

4. Other Exemplary Embodiments and Examples

Figure 30:
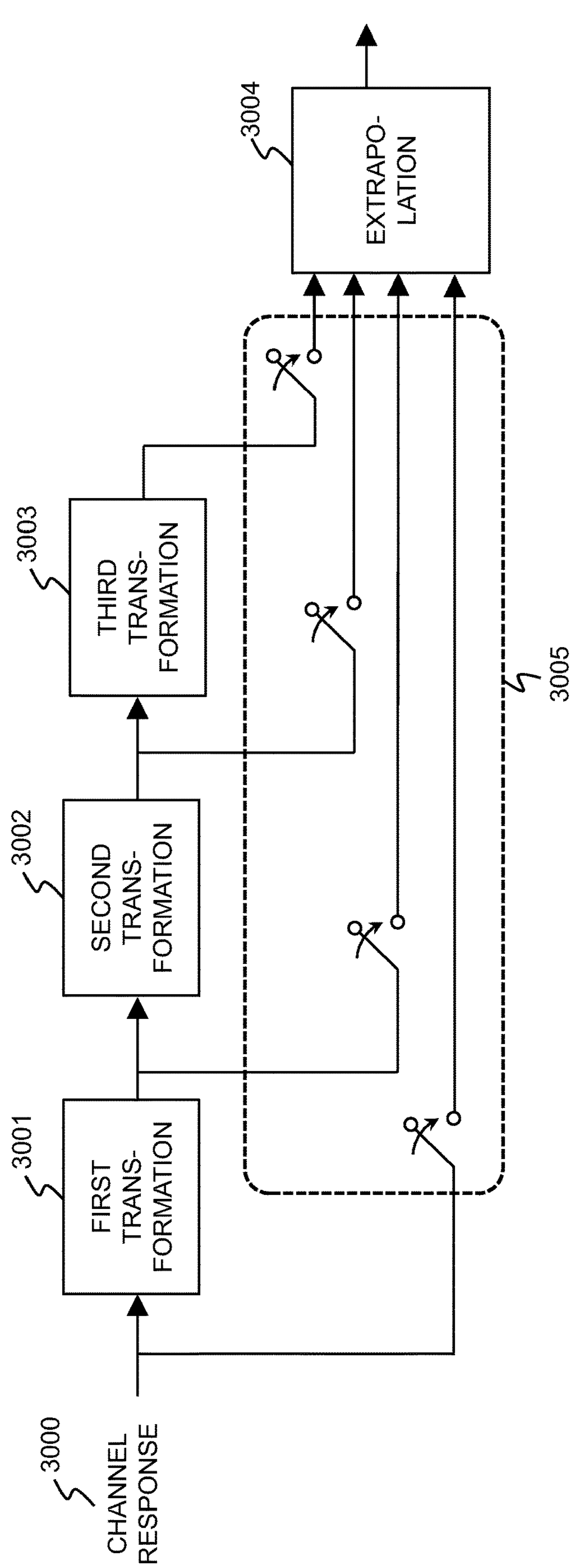
FIG. 30 is a schematic diagram illustrating operations of channel prediction according to another exemplary embodiment of the present disclosure.

With reference to FIG. 30, another exemplary embodiment of the present disclosure is described. Here, blocks 3001, 3002, and 3003 indicate three transformation operations for conversion:

(a) from subcarrier domain to delay domain;
(b) from antenna domain to beamspace domain; and
(c) from SRS time-slot domain to Doppler domain, respectively. A block 3004 indicates the extrapolation operation by using two or more inputs of channel estimates (only one channel estimate (3000) has been shown in FIG. 30, however, more than one channel estimate may be required for extrapolation as discussed earlier in the previous examples). A selector 3005 may select any combination of the transformations (a), (b), (c) and no transformation for the extrapolation. Accordingly, the transformation operations (a), (b) and (c) could also be in any other order or sequence in some variants. In this example, it is shown that some variants can selectively enable or disable some specific transformations. Thus, it is possible that fewer than three transformation operations are used prior to the extrapolation operation. After the extrapolation operation is performed, the corresponding inverse transformation operations may be performed. In case no transformation is applied before extrapolation, then such inverse transformation may not be required after extrapolation.

In some exemplary embodiments, it may be possible that the most dominant multipath components are used for extrapolation. For example, if some multipath taps are found to have significantly large amplitude or phase or both as compared to some other multipath taps, then only the significantly large taps may be used for extrapolation.

In some exemplary embodiments, channel prediction may be performed without any transformation operation. Details are described by referring to FIGS. 31 and 32.

Figure 31:
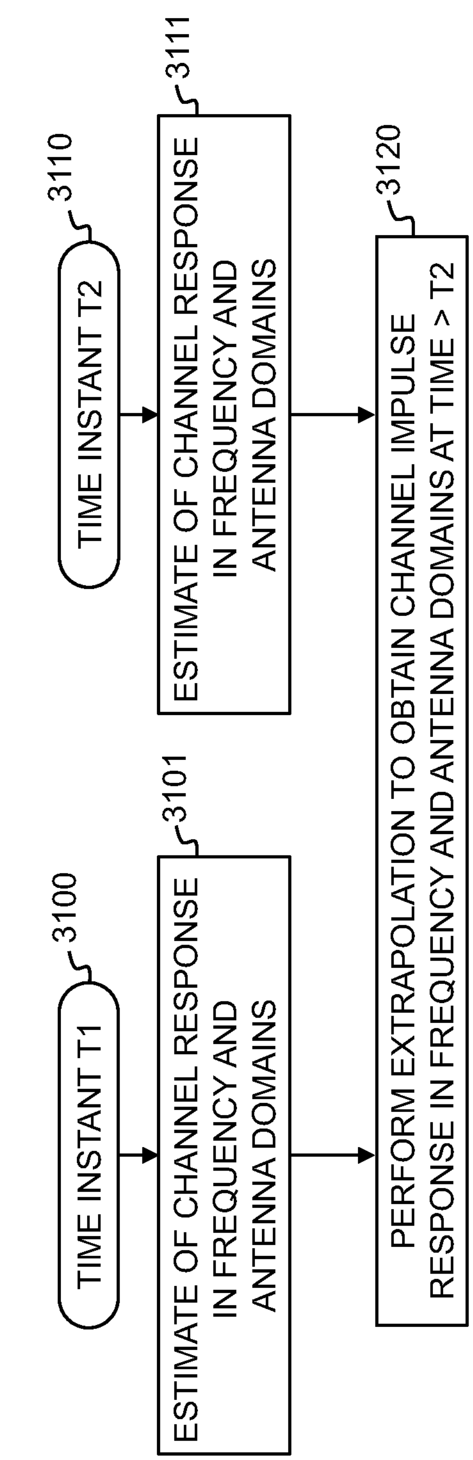
FIG. 31 is a flowchart illustrating operations for channel prediction in subcarrier and antenna domains, according to a further another exemplary embodiment of the present disclosure.
Figure 32:
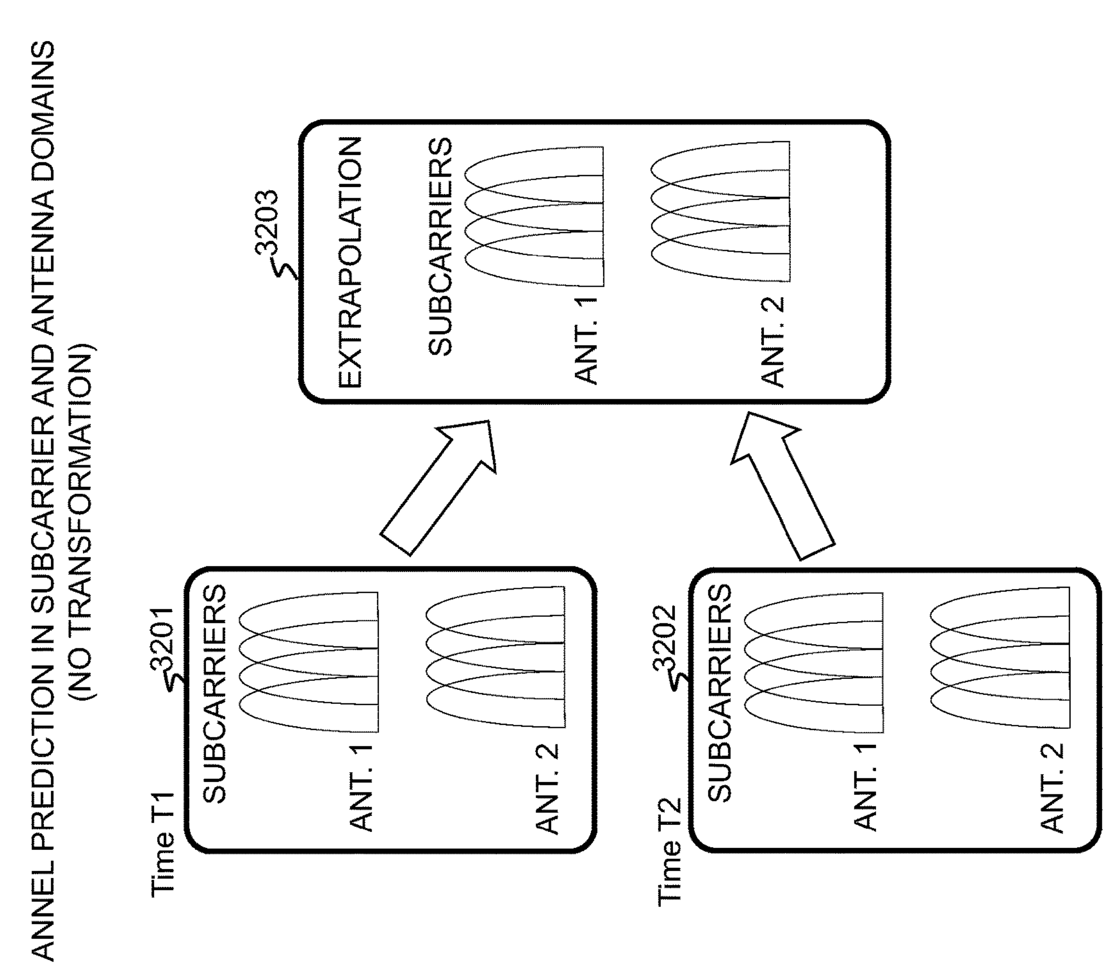
FIG. 32 is a schematic diagram illustrating operations for channel prediction shown in FIG. 31.

Referring to FIGS. 31 and 32, the BS device 100 may be able to compute frequency response of the channel from the received SRS at each of the two antennas ANT.1 and ANT.2. More specifically, the amplitude and phase of the channel corresponding to each subcarrier may be computed at each of the two antennas ANT.1 and ANT.2 in a method of channel estimation at a time instant denoted by T1, as shown in step 3101 of FIG. 31 (also refer to 3201 of FIG. 32). Alternatively, such a value may be represented as a complex number corresponding to each subcarrier and each antenna for a channel between the BS device 100 and the UE terminal 200 at the time instant T1. A similar step is performed at time instant T2 as shown using step 3111 of FIG. 31 (also refer to 3202 of FIG. 32).

Thus, outputs from step 3101 and step 3111 of FIG. 31 are fed as input to an extrapolation section, to obtain the channel response in frequency and antenna domains at time after T2, as described in step 3120 of FIG. 31 (also illustrated in 3203 of FIG. 32). In this manner, the channel prediction can be performed without any transformation operation.

In some exemplary embodiments, it may be possible to adopt an implementation of the present disclosure which has reduced complexity than a naïve implementation. The operations in the present disclosure may be categorized into two categories: (a) pre-processing, and (b) post-processing. With reference to FIG. 25, the IFFT operation denoted by 2509, FFT operation denoted by 2517, and FFT operation denoted by 2525 may be categorized as pre-processing operations. Furthermore, the extrapolation operation denoted by 2527, IFFT operations denoted by 2528 and 2529, and FFT operation denoted by 2530 may be categorized as post-processing operations.

Furthermore, there can be more operations in the post-processing operation including but not limited to a singular value decomposition (SVD) or its variant. A naïve implementation may require the pre-processing and post-processing operations be performed at every time slot. However, a low-complexity embodiment may be developed such that the pre-processing operations are performed only at the timeslot where SRS is received and channel estimation is performed. The pre-processing operations may not be performed at every timeslot, instead the result of the pre-processing operation may be stored in a memory. Only the post-processing operations may be performed at every time slot where channel prediction is intended.

In another exemplary embodiment, it may be possible to switch between channel prediction in one domain and channel prediction in another domain. An exemplary case is described here. It is seen from FIG. 16 and FIG. 25, and the related discussions that channel prediction in delay-beamspace domain can start producing the channel prediction result earlier than that of delay-Doppler-beamspace domain. This is primarily because for transforming into Doppler domain, channel response in several SRS time slots are necessary for the DFT operation. Hence, until the required number of SRS are obtained, the channel prediction cannot start in the delay-Doppler-beamspace domain. In such a situation, a channel prediction operation in delay-beamspace domain may be adopted till the time sufficient number of channel estimates are available for transformation to Doppler domain.

Application software in accordance with the present disclosure, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine-type communication applications.

TABLE 1

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

5. Supplementary Notes

The whole or part of the exemplary embodiments disclosed above can be described as, but not limited to, the following supplementary notes.

Supplementary Note 1

An apparatus comprising:
- a memory that stores a program including instructions for channel prediction;
- a controller that is configured to execute the instructions to:
  - compute at least one first channel response of a wireless channel between a transmitter and a receiver using a reference signal;
  - compute a second channel response between the transmitter and the receiver using the at least one first channel response,
- wherein:
- (a) the at least one first channel response is transformed using at least one first transformation from time domain to Doppler domain to output an intermediate first channel response;
- (b) the intermediate first channel response is processed using an extrapolation operation to output an intermediate second channel response;
- (c) the intermediate second channel response is transformed using at least one second transformation to get the second channel response in time domain.

Supplementary Note 2

An apparatus according to supplementary note 1, wherein:
- (a) the first transformation in the (a) is at least one of a discrete Fourier transform or some variant.
- (b) the second transformation in the (c) is at least one of an inverse discrete Fourier transform or some variant.

Supplementary Note 3

An apparatus according to supplementary note 1 wherein:
- (a) the second channel response is transformed by at least one of:
  - (a.1) frequency domain to delay domain
  - (a.2) antenna domain to angle domain
  - (a.3) time domain to Doppler domain
- (b) the output of the extrapolation operation is transformed using at least one of:
  - (b.1) Doppler domain to time domain
  - (b.2) angle domain to antenna domain
  - (b.3) delay domain to frequency domain.

Supplementary Note 4

A communication system comprising at least one first radio device and at least one second radio device, wherein
- the first radio device sends at least one reference signal to the second radio device,
- the second radio device including a controller configured to:
  - compute at least one first channel response between the second radio device and the first radio device using the reference signal,
  - compute a second channel response between the second radio device and the first radio device using the at least one first channel response by:
    - (a) transforming the at least one first channel response using at least one first transformation from time domain to Doppler domain,
    - (b) processing an output of the (a) using an extrapolation operation, and
    - (c) transforming an output of the extrapolation operation using at least one second transformation to get the second channel response in time domain.

6. Further Supplementary Notes

The whole or part of the exemplary embodiments disclosed above may be described as, but not limited to, the following further supplementary notes.

Further Supplementary Note 1

1. A communication device comprising:
- a wireless transceiver configured to communicate with another communication device through a wireless channel; and
- at least one processor configured to execute instructions to:
  - a) estimate at least one first channel response of the wireless channel based on a predetermined signal received from the another communication device; and
  - b) predict a second channel response based on the at least one first channel response by an extrapolation method for signal transmission to the another communication device at a time instant where no channel estimation is performed.

Further Supplementary Note 2

2. The communication device according to further supplementary note 1, wherein in the b), the second channel response is sequentially predicted based on a predetermined number of first channel responses that have been estimated most recently based on the predetermined signal received from the another communication device.

Further Supplementary Note 3

3. The communication device according to further supplementary note 1, wherein
- in the a), the at least one first channel response is estimated based on a reference signal received from the another communication device at predetermined intervals,
- in the b), the second channel response is predicted using the extrapolation method until a next first channel response is estimated.

Further Supplementary Note 4

4. The communication device according to further supplementary note 1, wherein the at least one first channel response is an estimate of the channel impulse response or channel frequency response, and the second channel response is one or more predicted channel value containing channel information of the wireless channel.

Further Supplementary Note 5

5. The communication device according to further supplementary note 1, wherein the b) comprises c) computing a beamforming weight of the wireless transceiver based on the second channel response for the signal transmission at the time instant where no channel estimation is performed.

Further Supplementary Note 6

6. The communication device according to further supplementary note 1, wherein in the b), the second channel response is predicted by:

b.1) transforming the at least one first channel response by at least one first transformation from time domain to Doppler domain, to generate at least one first intermediate channel response;

b.2) extrapolating the at least one first intermediate channel response to obtain at least one second intermediate channel response by the extrapolation method; and b.3) transforming the at least one second intermediate channel response by at least one second transformation from the Doppler domain to the time domain to generate the second channel response in the time domain.

Further Supplementary Note 7

7. The communication device according to further supplementary note 6, wherein the at least one first transformation is at least one of a discrete Fourier transform and an inverse discrete Fourier transform, and the second transformation is at least one of a discrete Fourier transform and an inverse discrete Fourier transform.

Further Supplementary Note 8

8. The communication device according to further supplementary note 6, wherein the first transformation and the second transformation are implemented using at least one of an N-point fast Fourier transform (FFT) and an N-point inverse fast Fourier transform (IFFT), where N is a power of 2 and N is larger than or equal to 2.

Further Supplementary Note 9

9. The communication device according to further supplementary note 8, wherein the at least one first transformation is implemented using a plurality of FFTs that includes two consecutive FFTs with one or more overlapping inputs between them, wherein the at least one second transformation is implemented using a plurality of IFFTs that includes two consecutive IFFTs with one or more overlapping inputs between them.

Further Supplementary Note 10

10. The communication device according to further supplementary note 6, wherein the b.1) is performed only at a time slot where the a) is performed, while the b.2) and b.3) are performed at every slot where prediction of the second channel response is performed.

Further Supplementary Note 11

11. The communication device according to further supplementary note 1, wherein in the b), the second channel response is predicted by:

b.1) transforming the at least one first channel response by at least one first transformation to generate at least one first intermediate channel response;

b.2) extrapolating the at least one first intermediate channel response to obtain at least one second intermediate channel response by the extrapolation method; and b.3) transforming the at least one second intermediate channel response by at least one second transformation to generate the second channel response, wherein the at least one first transformation performs at least one of transformations:

b.1.1) from frequency domain to delay domain;

b.1.2) from antenna domain to angle domain; and b.1.3) from time domain to Doppler domain, wherein the at least one second transformation performs at least one of transformations:

b.3.1) from Doppler domain to time domain;

b.3.2) from angle domain to antenna domain; and b.3.3) from delay domain to frequency domain, wherein the at least one second transformation performs an inverse transformation of the at least one first transformation.

Further Supplementary Note 12

12. The communication device according to further supplementary note 11, wherein the first transformation and second transformation comprises at least one of an N-point fast Fourier transform (FFT) and an N-point inverse fast Fourier transform (IFFT), where N is a power of 2 and N is larger than or equal to 2.

Further Supplementary Note 13

13. The communication device according to further supplementary note 12, wherein the at least one first transformation comprises at least one of an FFT and IFFT operations, wherein the at least one second transformation is implemented using at least one of an FFT and IFFT operations.

Further Supplementary Note 14

14. The communication device according to further supplementary note 11, wherein the at least one of the b.1.1) and b.1.2) is performed till the a) become possible.

Further Supplementary Note 15

15. The communication device according to further supplementary note 11, wherein the b.1.1) is used when at least one of an orthogonal frequency division multiplexing (OFDM), single-carrier frequency division multiple access (SC-FDMA) or a multicarrier communication is employed.

Further Supplementary Note 16

16. The communication device according to further supplementary note 11, wherein the b.1.2) is used when a multiple-antenna system is employed in at least one of the communication device and the another communication device.

Further Supplementary Note 17

17. The communication device according to further supplementary note 1, wherein the communication device is one of a UE terminal and a BS device and the another communication device are the other.

Further Supplementary Note 18

18. The communication device according to further supplementary note 1, wherein the communication device is a BS device that is configured to communicate with a plurality of UE terminals through different wireless channels, wherein the another communication device are one of the UE terminals communicating with the BS device through a corresponding wireless channel.

Further Supplementary Note 19

19. A channel prediction method by a processor in a communication device that is configured to communicate with another communication device through a wireless channel, comprising:

a) estimating at least one first channel response of the wireless channel based on a predetermined signal received from the another communication device; and b) extrapolating the at least one first channel response to obtain a second channel response by an extrapolating method for signal transmission to the another communication device at a time instant where no channel estimation is performed.

Further Supplementary Note 20

20. The channel prediction method according to further supplementary note 19, wherein the b) comprises:

b.1) transforming the at least one first channel response by at least one first transformation from time domain to Doppler domain, to generate at least one first intermediate channel response;

b.2) extrapolating the at least one first intermediate channel response to obtain at least one second intermediate channel response; and b.3) transforming the at least one second intermediate channel response by at least one second transformation from the Doppler domain to the time domain to generate the second channel response in the time domain.

Further Supplementary Note 21

21. The channel prediction method according to further supplementary note 20, wherein the first transformation comprises an N-point fast Fourier transform (FFT), where N is a power of 2 and N is larger than or equal to 2, and the second transformation comprises an N-point inverse fast Fourier transform (IFFT).

Further Supplementary Note 22

22. The channel prediction method according to further supplementary note 21, wherein the at least one first transformation is implemented using a plurality of FFTs that includes two consecutive FFTs with one or more overlapping inputs between them, wherein the at least one second transformation is implemented using a plurality of IFFTs that includes two consecutive IFFTs with one or more overlapping inputs between them.

Further Supplementary Note 23

23. The channel prediction method according to further supplementary note 20, wherein the b.1) is performed only at a time slot where the a) is performed, while the b.2) and b.3) are performed at every slot where prediction of the second channel response is performed.

Further Supplementary Note 24

24. The channel prediction method according to further supplementary note 19, wherein the b) comprises:

b.1) transforming the at least one first channel response by at least one first transformation to generate at least one first intermediate channel response;

b.2) extrapolating the at least one first intermediate channel response to obtain at least one second intermediate channel response; and b.3) transforming the at least one second intermediate channel response by at least one second transformation to generate the second channel response, wherein the at least one first transformation comprises at least one of transformations:

b.1.1) from frequency domain to delay domain;

b.1.2) from antenna domain to angle domain; and b.1.3) from time domain to Doppler domain, wherein the at least one second transformation comprises at least one of transformations:

b.3.1) from Doppler domain to time domain;

b.3.2) from angle domain to antenna domain; and b.3.3) from delay domain to frequency domain, wherein the at least one second transformation performs an inverse transformation of the at least one first transformation.

Further Supplementary Note 25

25. The channel prediction method according to further supplementary note 24, wherein the at least one of the b.1.1) and b.1.2) and b.1.3) and b.3.1) and b.3.2) and b.3.3) is performed till the a) become possible.

Further Supplementary Note 26

26. The channel prediction method according to supplementary note 24, wherein the at least one of the b.1.1) and b.1.2) and b.3.2) and b.3.3) is performed till the at least one of a) and b.1.3) and b.3.1) becomes possible.

Further Supplementary Note 27

27. The channel prediction method according to further supplementary note 24, wherein the first transformation and second transformation comprises at least one of an N-point fast Fourier transform (FFT) and an N-point inverse fast Fourier transform (IFFT), where N is a power of 2 and N is larger than or equal to 2.

Further Supplementary Note 28

28. The channel prediction method according to further supplementary note 27, wherein the at least one first transformation comprises at least one of an FFT and an IFFT, wherein the at least one second transformation comprises at least one of an FFT and IFFT.

Further Supplementary Note 29

29. The communication device according to further supplementary note 1, wherein the extrapolation method is at least one of a linear extrapolation, linear regression, least-square estimation, non-linear regression, polynomial regression, spline regression and curve fitting.

Further Supplementary Note 30

30. The channel prediction method according to further supplementary note 19, wherein the extrapolation method is at least one of a linear extrapolation, linear regression, least-square estimation, non-linear regression, polynomial regression, spline regression and curve fitting.

Further Supplementary Note 31

31. A wireless communication system that include a plurality of communication devices including a first communication device and a second communication device, the first communication device comprising:

a wireless transceiver configured to communicate with the second communication device through a wireless channel; and at least one processor configured to execute instructions to:

a) estimate at least one first channel response of the wireless channel based on a reference signal received from the second communication device; and b) predict a second channel response based on the at least one first channel response by an extrapolation method for signal transmission to the second communication device at a time instant where no channel estimation is performed.

Further Supplementary Note 32

32. The wireless communication system according to further supplementary note 31, wherein in the b), the second channel response is predicted by:

b.1) transforming the at least one first channel response by at least one first transformation from time domain to Doppler domain, to generate at least one first intermediate channel response;

b.2) extrapolating the at least one first intermediate channel response to obtain at least one second intermediate channel response by the extrapolation method; and b.3) transforming the at least one second intermediate channel response by at least one second transformation from the Doppler domain to the time domain to generate the second channel response in the time domain.

Further Supplementary Note 33

33. The wireless communication system according to further supplementary note 32, wherein the at least one first transformation is at least one of a discrete Fourier transform and an inverse discrete Fourier transform, and the second transformation is at least one of a discrete Fourier transform and an inverse discrete Fourier transform.

Further Supplementary Note 34

34. The wireless communication system according to further supplementary note 32, wherein the first transformation and the second transformation are implemented using an N-point fast Fourier transform (FFT) and an N-point inverse fast Fourier transform (IFFT), where N is a power of 2 and N is larger than or equal to 2.

Further Supplementary Note 35

35. The wireless communication system according to further supplementary note 34, wherein the at least one first transformation is implemented using a plurality of FFTs that includes two consecutive FFTs with one or more overlapping inputs between them, wherein the at least one second transformation is implemented using a plurality of IFFTs that includes two consecutive IFFTs with one or more overlapping inputs between them.

Further Supplementary Note 36

36. The wireless communication system according to further supplementary note 32, wherein the b.1) is performed only at a time slot where the a) is performed, while the b.2) and b.3) are performed at every slot where prediction of the second channel response is performed.

Further Supplementary Note 37

37. The wireless communication system according to further supplementary note 31, wherein in the b), the second channel response is predicted by:

b.1) transforming the at least one first channel response by at least one first transformation to generate at least one first intermediate channel response;

b.2) extrapolating at least one first intermediate channel response to obtain at least one second intermediate channel response by the extrapolation method; and b.3) transforming the at least one second intermediate channel response by at least one second transformation to generate the second channel response, wherein the at least one first transformation performs at least one of transformations:

b.1.1) from frequency domain to delay domain;

b.1.2) from antenna domain to angle domain; and b.1.3) from time domain to Doppler domain, wherein the at least one second transformation performs at least one of transformations:

b.3.1) from Doppler domain to time domain b.3.2) from angle domain to antenna domain; and b.3.3) from delay domain to frequency domain, wherein the at least one second transformation performs an inverse transformation of the at least one first transformation.

Further Supplementary Note 38

38. The wireless communication system according to further supplementary note 37, wherein the first transformation and second transformation comprises at least one of an N-point fast Fourier transform (FFT) and an N-point inverse fast Fourier transform (IFFT), where N is a power of 2 and N is larger than or equal to 2.

Further Supplementary Note 39

39. The wireless communication system according to further supplementary note 38, wherein the at least one first transformation comprises at least one of an FFT and an IFFT, wherein the at least one second transformation comprises at least one of an FFT and IFFT.

Further Supplementary Note 40

40. The wireless communication system according to further supplementary note 37, wherein the at least one of the b.1.1)-b.1.3) and b.3.1)-b.3.3) is performed till the a) become possible.

Further Supplementary Note 41

41. The wireless communication system according to further supplementary note 37, wherein the b.1.1) is used when at least one of an orthogonal frequency division multiplexing (OFDM), single-carrier frequency division multiple access (SC-FDMA) or a multicarrier communication is employed.

Further Supplementary Note 42

42. The wireless communication system according to further supplementary note 37, wherein the b.1.2) is used when a multiple-antenna system is employed in at least one of the communication device and the another communication device.

Further Supplementary Note 43

43. The wireless communication system according to further supplementary note 31, wherein in the b), a beamforming weight of the wireless transceiver is computed based on the second channel response for the signal transmission.

Further Supplementary Note 44

44. A non-transitory recording medium storing a computer-readable program for channel prediction in a communication device that is configured to communicate with another communication device through a wireless channel, the computer-readable program comprising instructions to:

a) estimate at least one first channel response of the wireless channel based on a predetermined signal received from the another communication device; and b) extrapolate the at least one first channel response to obtain a second channel response by an extrapolating method for signal transmission to the another communication device at a time instant where no channel estimation is performed.

Further Supplementary Note 45

45. The non-transitory recording medium according to further supplementary note 44, wherein the b) comprises instructions to:

b.1) transform the at least one first channel response by at least one first transformation from time domain to Doppler domain, to generate at least one first intermediate channel response;

b.2) extrapolate the at least one first intermediate channel response to obtain at least one second intermediate channel response; and b.3) transform the at least one second intermediate channel response by at least one second transformation from the Doppler domain to the time domain to generate the second channel response in the time domain.

Further Supplementary Note 46

46. The non-transitory recording medium according to further supplementary note 44, wherein the b) comprises instructions to:

b.1) transform the at least one first channel response by at least one first transformation to generate at least one first intermediate channel response;

b.2) extrapolate the at least one first intermediate channel response to obtain at least one second intermediate channel response; and b.3) transform the at least one second intermediate channel response by at least one second transformation to generate the second channel response, wherein the at least one first transformation comprises at least one of transformations:

b.1.1) from frequency domain to delay domain;

b.1.2) from antenna domain to angle domain; and b.1.3) from time domain to Doppler domain, wherein the at least one second transformation comprises at least one of transformations:

b.3.1) from Doppler domain to time domain;

b.3.2) from angle domain to antenna domain; and b.3.3) from delay domain to frequency domain, wherein the at least one second transformation performs an inverse transformation of the at least one first transformation.

Further Supplementary Note 47

47. The communication device according to further supplementary note 1, wherein in the b), the second channel response is predicted by extrapolating the at least one first channel response in frequency and antenna domains to obtain the second channel response in frequency and antenna domains by the extrapolation method.

The above exemplary embodiments can be applied to wireless communication systems employing beamforming transmission.

What is claimed is:

1. A communication device in a multi-antenna wireless communication system, comprising:

a multi-antenna wireless transceiver configured to communicate with another communication device through a wireless channel; and at least one processor configured to execute instructions to:

a) estimate at least one first channel response of the wireless channel based on a predetermined signal received from the another communication device; and b) predict a second channel response based on the at least one first channel response by an extrapolation method for signal transmission to the another communication device at a time instant where no channel estimation is performed, wherein in the b), the second channel response is predicted by:

b.1) transforming the at least one first channel response by at least one first transformation to generate at least one first intermediate channel response;

b.2) extrapolating the at least one first intermediate channel response to obtain at least one second intermediate channel response by the extrapolation method; and b.3) transforming the at least one second intermediate channel response by at least one second transformation to generate the second channel response, wherein the at least one first transformation performs at least one of transformations:

b.1.1) from frequency domain to delay domain;

b.1.2) from antenna domain to angle domain; and b.1.3) from time domain to Doppler domain, wherein the at least one second transformation performs at least one of transformations:

b.3.1) from Doppler domain to time domain;

b.3.2) from angle domain to antenna domain; and b.3.3) from delay domain to frequency domain, wherein the at least one second transformation performs an inverse transformation of the at least one first transformation.

2. The communication device according to claim 1, wherein in the b), the second channel response is sequentially predicted based on a predetermined number of first channel responses that have been estimated most recently based on the predetermined signal received from the another communication device.

3. The communication device according to claim 1, wherein in the a), the at least one first channel response is estimated based on a reference signal received from the another communication device at predetermined intervals, in the b), the second channel response is predicted using the extrapolation method until a next first channel response is estimated.

4. The communication device according to claim 1, wherein the at least one first channel response is an estimate of the channel impulse response or channel frequency response, and the second channel response is one or more predicted channel value containing channel information of the wireless channel.

5. The communication device according to claim 1, wherein in the b), a beamforming weight of the wireless transceiver is computed based on the second channel response for the signal transmission.

6. The communication device according to claim 1, wherein in the b), the second channel response is predicted by:

b.1) transforming the at least one first channel response by at least one first transformation from time domain to Doppler domain, to generate at least one first intermediate channel response;

b.2) extrapolating the at least one first intermediate channel response to obtain at least one second intermediate channel response by the extrapolation method; and b.3) transforming the at least one second intermediate channel response by at least one second transformation from the Doppler domain to the time domain to generate the second channel response in the time domain.

7. The communication device according to claim 6, wherein the at least one first transformation is at least one of a discrete Fourier transform and an inverse discrete Fourier transform, and the second transformation is at least one of a discrete Fourier transform and an inverse discrete Fourier transform.

8. The communication device according to claim 7, wherein the first transformation and the second transformation are implemented using at least one of an N-point fast Fourier transform (FFT) and an N-point inverse fast Fourier transform (IFFT), where Nis a power of 2 and N is larger than or equal to 2.

9. The communication device according to claim 8, wherein the at least one first transformation is implemented using a plurality of FFTs that includes two consecutive FFTs with one or more overlapping inputs between them, wherein the at least one second transformation is implemented using a plurality of IFFTs that includes two consecutive IFFTs with one or more overlapping inputs between them.

10. The communication device according to claim 6, wherein the b.1) is performed only at a time slot where the a) is performed, while the b.2) and b.3) are performed at every slot where prediction of the second channel response is performed.

11. The communication device according to claim 1, wherein the first transformation and second transformation comprises at least one of an N-point fast Fourier transform (FFT) and an N-point inverse fast Fourier transform (IFFT), where Nis a power of 2 and N is larger than or equal to 2.

12. The communication device according to claim 11, wherein the at least one first transformation comprises at least one of an FFT and an IFFT, wherein the at least one second transformation comprises at least one of an FFT and IFFT.

13. The communication device according to claim 1, wherein the at least one of the b.1.1)-b.1.3) and the b.3.1)-b.3.3) is performed until the a) becomes possible.

14. A channel prediction method by a processor in a communication device that is configured to communicate with another communication device through a wireless channel in a multi-antenna wireless communication system, comprising:

a) estimating at least one first channel response of the wireless channel based on a predetermined signal received from the another communication device; and b) extrapolating the at least one first channel response to obtain a second channel response by an extrapolating method for signal transmission to the another communication device at a time instant where no channel estimation is performed, wherein the b) comprises:

b.1) transforming the at least one first channel response by at least one first transformation to generate at least one first intermediate channel response;

b.2) extrapolating the at least one first intermediate channel response to obtain at least one second intermediate channel response; and b.3) transforming the at least one second intermediate channel response by at least one second transformation to generate the second channel response, wherein the at least one first transformation comprises at least one of transformations:

b.1.1) from frequency domain to delay domain;

b.1.2) from antenna domain to angle domain; and b.1.3) from time domain to Doppler domain, wherein the at least one second transformation comprises at least one of transformations:

b.3.1) from Doppler domain to time domain;

b.3.2) from angle domain to antenna domain; and b.3.3) from delay domain to frequency domain, wherein the at least one second transformation performs an inverse transformation of the at least one first transformation.

15. The channel prediction method according to claim 14, wherein the b) comprises:

b.1) transforming the at least one first channel response by at least one first transformation from time domain to Doppler domain, to generate at least one first intermediate channel response;

b.2) extrapolating the at least one first intermediate channel response to obtain at least one second intermediate channel response; and b.3) transforming the at least one second intermediate channel response by at least one second transformation from the Doppler domain to the time domain to generate the second channel response in the time domain.

16. The channel prediction method according to claim 15, wherein the b.1) is performed only at a time slot where the a) is performed, while the b.2) and b.3) are performed at every slot where prediction of the second channel response is performed.

17. The channel prediction method according to claim 14, wherein the at least one of the b.1.1)-b.1.3) and the b.3.1)-b.3.3) is performed until the a) becomes possible.

18. A non-transitory recording medium storing a computer-readable program for channel prediction in a communication device that is configured to communicate with another communication device through a wireless channel in a multi-antenna wireless communication system, the computer-readable program comprising instructions that, when executed by at least one processor, cause the at least one processor to:

a) estimate at least one first channel response of the wireless channel based on a predetermined signal received from the another communication device; and b) extrapolate the at least one first channel response to obtain a second channel response by an extrapolating method for signal transmission to the another communication device at a time instant where no channel estimation is performed, wherein the b) comprises:

b.1) transforming the at least one first channel response by at least one first transformation to generate at least one first intermediate channel response;

b.2) extrapolating the at least one first intermediate channel response to obtain at least one second intermediate channel response; and b.3) transforming the at least one second intermediate channel response by at least one second transformation to generate the second channel response, wherein the at least one first transformation comprises at least one of transformations:

b.1.1) from frequency domain to delay domain;

b.1.2) from antenna domain to angle domain; and b.1.3) from time domain to Doppler domain, wherein the at least one second transformation comprises at least one of transformations:

b.3.1) from Doppler domain to time domain;

b.3.2) from angle domain to antenna domain; and b.3.3) from delay domain to frequency domain, wherein the at least one second transformation performs an inverse transformation of the at least one first transformation.

* * * * *